(12) United States Patent
Buck

(10) Patent No.: US 8,831,988 B2
(45) Date of Patent: *Sep. 9, 2014

(54) REPOSITIONING OF MARKET INFORMATION ON TRADING SCREENS

(75) Inventor: Brian J. Buck, Lisle, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,061

(22) Filed: Aug. 13, 2012

(65) Prior Publication Data

US 2012/0303513 A1    Nov. 29, 2012

Related U.S. Application Data

(63) Continuation of application No. 13/044,117, filed on Mar. 9, 2011, now Pat. No. 8,275,696, which is a continuation of application No. 12/566,117, filed on Sep. 24, 2009, now Pat. No. 7,930,240, which is a continuation of application No. 11/415,407, filed on May 1, 2006, now Pat. No. 7,613,651, which is a continuation of application No. 10/609,965, filed on Jun. 30, 2003, now Pat. No. 7,587,357.

(51) Int. Cl.
*G06Q 40/00* (2012.01)
*G06Q 40/04* (2012.01)
*G06Q 40/06* (2012.01)

(52) U.S. Cl.
CPC ............... *G06Q 40/06* (2013.01); *G06Q 40/00* (2013.01); *G06Q 40/04* (2013.01)
USPC ............................................. 705/37; 705/35

(58) Field of Classification Search
USPC ..................................................... 705/37, 35
See application file for complete search history.

(56) References Cited

U.S. PATENT DOCUMENTS 3,792,462 A    2/1974    Casey et al.
4,674,044 A    6/1987    Kalmus et al.
(Continued)

FOREIGN PATENT DOCUMENTS

EP    388162 A2    9/1990
EP    1067471 A1    1/2001
(Continued)

OTHER PUBLICATIONS

Trading Screen, SWX Exchange, 1990, two pages.
(Continued)

*Primary Examiner* — Bruce I Ebersman
*Assistant Examiner* — Kevin Poe
(74) *Attorney, Agent, or Firm* — McDonnell Boehnen Hulbert & Berghoff LLP

(57) ABSTRACT

As market conditions descend or ascend an axis of prices, the display of market information is repositioned, at a pre-determined rate if desired, around an item of interest. An item of interest may include the best bid price, the best ask price, the inside market, a moving average, a last traded price, a theoretical value, the result of an equation, or some other item of interest to the trader. According to the present embodiments, market information may be displayed in a region relative to an axis of prices, and when an event occurs, a repositioning signal is initialized causing the axis to be repositioned such that the item of interest is positioned at a pre-determined location in the region. The price axis can be repositioned at a fixed rate or at a dynamically variable rate.

28 Claims, 11 Drawing Sheets

(56) References Cited

U.S. PATENT DOCUMENTS

| | | |
|---|---|---|
| 4,750,135 A | 6/1988 | Boilen |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,243,331 A | 9/1993 | McCausland et al. |
| 5,270,922 A | 12/1993 | Higgins |
| 5,297,031 A | 3/1994 | Gutterman et al. |
| 5,297,032 A | 3/1994 | Trojan et al. |
| 5,339,392 A | 8/1994 | Risberg et al. |
| 5,619,631 A | 4/1997 | Schott |
| 5,675,746 A | 10/1997 | Marshall |
| 5,689,651 A | 11/1997 | Lozman |
| 5,689,652 A | 11/1997 | Lupien et al. |
| 5,768,158 A | 6/1998 | Adler et al. |
| 5,774,877 A | 6/1998 | Patterson, Jr. et al. |
| 5,774,878 A | 6/1998 | Marshall |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,845,266 A | 12/1998 | Lupien et al. |
| 5,873,071 A | 2/1999 | Ferstenberg et al. |
| 5,915,245 A | 6/1999 | Patterson, Jr. et al. |
| 5,924,082 A | 7/1999 | Silverman et al. |
| 5,924,083 A | 7/1999 | Silverman et al. |
| 5,926,801 A | 7/1999 | Matsubara |
| 5,946,667 A | 8/1999 | Tull, Jr. et al. |
| 5,950,177 A | 9/1999 | Lupien et al. |
| 5,960,411 A | 9/1999 | Hartman et al. |
| 5,963,923 A | 10/1999 | Garber |
| 5,966,139 A | 10/1999 | Anupam et al. |
| 6,012,046 A | 1/2000 | Lupien et al. |
| 6,014,643 A | 1/2000 | Minton |
| 6,035,287 A | 3/2000 | Stallaert et al. |
| 6,073,115 A | 6/2000 | Marshall |
| 6,073,119 A | 6/2000 | Bornemisza-Wahr et al. |
| 6,098,051 A | 8/2000 | Lupien et al. |
| 6,115,698 A | 9/2000 | Tuck et al. |
| 6,131,087 A | 10/2000 | Luke et al. |
| 6,134,535 A | 10/2000 | Belzberg |
| 6,161,098 A | 12/2000 | Wallman |
| 6,188,403 B1 | 2/2001 | Sacerdoti et al. |
| 6,195,647 B1 | 2/2001 | Martyn et al. |
| 6,272,474 B1 | 8/2001 | Garcia |
| 6,278,982 B1 | 8/2001 | Korhammer et al. |
| 6,282,521 B1 | 8/2001 | Howorka |
| 6,317,727 B1 | 11/2001 | May |
| 6,343,278 B1 | 1/2002 | Jain et al. |
| 6,366,293 B1 | 4/2002 | Hamilton et al. |
| 6,408,282 B1 | 6/2002 | Buist |
| 6,421,653 B1 | 7/2002 | May et al. |
| 6,516,303 B1 | 2/2003 | Wallman |
| 6,697,099 B2 | 2/2004 | Smith et al. |
| 6,766,304 B2 | 7/2004 | Kemp, II et al. |
| 6,772,132 B1 | 8/2004 | Kemp, II et al. |
| 6,826,553 B1 | 11/2004 | DaCosta et al. |
| 6,839,686 B1 | 1/2005 | Galant |
| 6,876,981 B1 | 4/2005 | Berckmans |
| 6,938,011 B1 | 8/2005 | Kemp, II et al. |
| 6,993,504 B1 | 1/2006 | Friesen et al. |
| 7,124,424 B2 | 10/2006 | Gordon et al. |
| 7,127,424 B2 | 10/2006 | Kemp, II et al. |
| 7,155,410 B1 | 12/2006 | Woodmansey et al. |
| 7,181,424 B1 | 2/2007 | Ketchum et al. |
| 7,181,425 B1 | 2/2007 | Cha |
| 7,209,896 B1 | 4/2007 | Serkin et al. |
| 7,212,999 B2 | 5/2007 | Friesen et |
| 7,228,289 B2 | 6/2007 | Brumfield et al. |
| 7,243,083 B2 | 7/2007 | Burns et al. |
| 7,305,361 B2 | 12/2007 | Otero et al. |
| 7,389,264 B2 | 6/2008 | Kemp, II et al. |
| 7,389,268 B1 | 6/2008 | Kemp, II et al. |
| 7,401,046 B2 | 7/2008 | Hollerman et al. |
| 7,406,444 B2 | 7/2008 | Eng et al. |
| 7,418,422 B2 | 8/2008 | Burns |
| 7,437,325 B2 * | 10/2008 | Kemp et al. ............... 705/37 |
| 7,447,655 B2 | 11/2008 | Brumfield et al. |
| 7,496,535 B2 | 2/2009 | Otero et al. |
| 7,505,932 B2 | 3/2009 | Kemp, II et al. |
| 7,509,276 B2 | 3/2009 | Brumfield et al. |
| 7,512,561 B2 | 3/2009 | Burns |
| 7,533,056 B2 | 5/2009 | Friesen et al. |
| 7,562,038 B1 | 7/2009 | Brumfield et al. |
| 7,571,136 B2 | 8/2009 | May |
| 7,577,602 B2 | 8/2009 | Singer |
| 7,577,607 B2 | 8/2009 | Singer |
| 7,587,357 B1 | 9/2009 | Buck |
| 7,613,649 B2 | 11/2009 | Brouwer |
| 7,613,651 B1 | 11/2009 | Buck |
| 7,664,695 B2 | 2/2010 | Cutler |
| 7,672,895 B2 | 3/2010 | Mintz et al. |
| 7,676,411 B2 | 3/2010 | Kemp, II et al. |
| 7,680,721 B2 | 3/2010 | Cutler |
| 7,680,724 B2 | 3/2010 | Brumfield et al. |
| 7,685,055 B2 | 3/2010 | Brumfield et al. |
| 7,693,768 B2 | 4/2010 | Kemp, II et al. |
| 7,707,086 B2 | 4/2010 | Burns et al. |
| 7,720,742 B1 | 5/2010 | Mauro et al. |
| 7,725,382 B2 | 5/2010 | Kemp, II et al. |
| 7,813,996 B2 | 10/2010 | Kemp, II et al. |
| 7,818,247 B2 | 10/2010 | Kemp, II et al. |
| 7,870,056 B2 * | 1/2011 | Ketchum et al. ............... 705/37 |
| 7,890,414 B2 | 2/2011 | Brumfield et al. |
| 7,904,374 B2 | 3/2011 | Kemp, II et al. |
| 7,930,240 B1 | 4/2011 | Buck |
| 2002/0023038 A1 | 2/2002 | Fritsch et al. |
| 2002/0035534 A1 | 3/2002 | Buist et al. |
| 2002/0046146 A1 | 4/2002 | Otero et al. |
| 2002/0046149 A1 | 4/2002 | Otero et al. |
| 2002/0046151 A1 | 4/2002 | Otero et al. |
| 2002/0046156 A1 | 4/2002 | Horn et al. |
| 2002/0049661 A1 | 4/2002 | Otero et al. |
| 2002/0055899 A1 | 5/2002 | Williams |
| 2002/0059129 A1 * | 5/2002 | Kemp et al. ............... 705/37 |
| 2002/0073017 A1 | 6/2002 | Robertson |
| 2002/0091611 A1 | 7/2002 | Minton |
| 2002/0099644 A1 | 7/2002 | Kemp, II et al. |
| 2002/0120551 A1 | 8/2002 | Jones |
| 2002/0138401 A1 | 9/2002 | Allen et al. |
| 2002/0178096 A1 | 11/2002 | Marshall |
| 2003/0004852 A1 * | 1/2003 | Burns ............... 705/37 |
| 2003/0004853 A1 | 1/2003 | Ram et al. |
| 2003/0009411 A1 * | 1/2003 | Ram et al. ............... 705/37 |
| 2003/0023536 A1 | 1/2003 | Hollerman et al. |
| 2003/0023542 A1 | 1/2003 | Kemp, II et al. |
| 2003/0065608 A1 | 4/2003 | Cutler |
| 2003/0069834 A1 | 4/2003 | Cutler |
| 2003/0083978 A1 * | 5/2003 | Brouwer ............... 705/37 |
| 2003/0097325 A1 | 5/2003 | Friesen et al. |
| 2003/0126065 A1 | 7/2003 | Eng et al. |
| 2003/0200167 A1 * | 10/2003 | Kemp et al. ............... 705/37 |
| 2003/0208424 A1 * | 11/2003 | Tenorio ............... 705/35 |
| 2003/0236737 A1 | 12/2003 | Kemp, II et al. |
| 2004/0093300 A1 | 5/2004 | Burns |
| 2004/0103054 A1 | 5/2004 | Singer |
| 2004/0117292 A1 | 6/2004 | Brumfield et al. |
| 2005/0010520 A1 * | 1/2005 | Dinwoodie ............... 705/37 |
| 2005/0149429 A1 | 7/2005 | Kemp, II et al. |
| 2005/0262003 A1 | 11/2005 | Brumfield et al. |
| 2006/0195388 A1 | 8/2006 | Kemp, II et al. |
| 2006/0195389 A1 | 8/2006 | Kemp, II et al. |
| 2006/0200405 A1 | 9/2006 | Burns et al. |
| 2006/0259382 A1 | 11/2006 | Kemp, II et al. |
| 2006/0259383 A1 | 11/2006 | Kemp, II et al. |
| 2006/0259384 A1 | 11/2006 | Schluetter et al. |
| 2006/0259404 A1 | 11/2006 | Brumfield et al. |
| 2006/0259406 A1 * | 11/2006 | Kemp et al. ............... 705/37 |
| 2006/0259411 A1 | 11/2006 | Burns |
| 2006/0265303 A1 | 11/2006 | Kemp, II et al. |
| 2006/0265304 A1 | 11/2006 | Brumfield et al. |
| 2006/0265305 A1 | 11/2006 | Schluetter et al. |
| 2006/0271475 A1 | 11/2006 | Brumfield et al. |
| 2007/0038554 A1 | 2/2007 | Kemp, II et al. |

(56) References Cited

U.S. PATENT DOCUMENTS

| | | |
|---|---|---|
| 2007/0038555 A1 | 2/2007 | Kemp, II et al. |
| 2007/0038556 A1 | 2/2007 | Kemp, II et al. |
| 2007/0038557 A1 | 2/2007 | Kemp, II et al. |
| 2007/0136182 A1* | 6/2007 | Ketchum et al. ............ 705/37 |
| 2010/0138335 A1 | 6/2010 | Kemp, II et al. |
| 2010/0332380 A1 | 12/2010 | Kemp, II et al. |
| 2011/0153486 A1 | 6/2011 | Kemp, II et al. |
| 2011/0161223 A1 | 6/2011 | Buck |

FOREIGN PATENT DOCUMENTS

| | | |
|---|---|---|
| EP | 1319211 B1 | 6/2003 |
| JP | 6504152 A | 5/1994 |
| JP | H10301870 A | 11/1998 |
| WO | 90/11571 A1 | 10/1990 |
| WO | 91/14231 A1 | 9/1991 |
| WO | 92/12488 A1 | 7/1992 |
| WO | 93/15467 A1 | 8/1993 |
| WO | 95/26005 A1 | 9/1995 |
| WO | 98/13778 A1 | 4/1998 |
| WO | 98/49639 A1 | 11/1998 |
| WO | 99/13424 A1 | 3/1999 |
| WO | 99/19821 A1 | 4/1999 |
| WO | 99/30259 A1 | 6/1999 |
| WO | 99/53424 A1 | 10/1999 |
| WO | 00/52619 A1 | 9/2000 |
| WO | 00/62187 A2 | 10/2000 |
| WO | 00/65510 A1 | 11/2000 |
| WO | 01/16830 A1 | 3/2001 |
| WO | 01/16852 A2 | 3/2001 |
| WO | 01/22315 A2 | 3/2001 |
| WO | 01/27843 A1 | 4/2001 |
| WO | 01/65403 A2 | 9/2001 |
| WO | 01/88808 A1 | 11/2001 |
| WO | 00/62187 A3 | 12/2001 |
| WO | 01/22315 A3 | 1/2002 |
| WO | 02/59815 A1 | 1/2002 |
| WO | 02/29686 A1 | 4/2002 |
| WO | 01/16852 A8 | 6/2002 |
| WO | 02/48945 A1 | 6/2002 |
| WO | 02/069226 A2 | 9/2002 |
| WO | 02/079904 A2 | 10/2002 |
| WO | 02/093325 A2 | 11/2002 |
| WO | 02/103601 A1 | 12/2002 |
| WO | 03/090032 A2 | 10/2003 |
| WO | 03/090032 A3 | 10/2003 |

OTHER PUBLICATIONS

"Expanding Futures and Options Trading Around the World, Around the Clock," GLOBEX, 1989, 48 pages.

Hansell, S., "The Computer that Ate Chicago," Institutional Investor, Feb. 1989, 5 pages.

"Sydney Futures Exchange Announces Plans to Join GLOBEX," GLOBEX Report: An Update on the CME global electronic exchange, vol. II, No. 2, Feb. 10, 1989, 4 pages.

New York Mercantile Exchange (NYMEX) Access Documents, Feb. 28, 1992, 413 pages.

The Computer Assisted Trading System (CATS) Traders' Manual, Toronto Stock Exchange, Sep. 30, 1977, 142 pages.

Market Watch Trading Screen, n.d., 1 page.

Grummer, et al., "Preliminary Feasibility Study," Bermudex Ltd., Nov. 1980,100 pages.

Peake, et al., Appendix C of Preliminary Feasibility Study, "The ABCs of Trading on a National Market System," Bermudex Ltd., Sep. 1997,16 pages.

Peake, J.W., Appendix E of Preliminary Feasibility Study, "The Last Fifteen Meters," Bermudex Ltd., Jun. 15, 1997,18 pages.

Declaration of Brendan Bradley in Case No. 04 C 5312, Nov. 18, 2004, 27 pages.

Memorandum Opinion and Order of Judge James B. Moran in Case No. 04 C 5312, Feb. 9, 2005, 22 pages.

"APT: A trading system for the future," The London International Financial Futures Exchange (LIFFE), 1990, 11 pages.

Trading Screen, INTEX of Bermuda, 1984, one page.

Weber, B.W., "Information Technology in the Major International Financial Markets," Stem School of Business, New York University, Apr. 7, 1993, pp. 1-43.

Trading Screen, TIFFE Exchange, circa 1989-1990, one page.

Trading Screen, MEFF Exchange, 1990, one page.

Cavaletti, C., "Order Routing," *Futures* Magazine, Feb. 1997, pp. 68-70.

"AURORA: The most technologically advanced trading system available today," Chicago Board of Trade, 1989, 11 pages.

"One Click Trading Options," Trading Technologies, Inc., 1998, one page.

USPTO Presentation, NASDAQ, Nov. 8, 2001, 15 pages.

Kharouf, J. and Cavaletti, C. "A Trading Room with a View," *Futures,* vol. 27, Nov. 1998, pp. 66-71.

X_Trader Product HTML Page [online], Trading Technologies International, Inc., Jun. 9, 2000. [Retrieved on Mar. 22, 2001] from the Internet: www.tradingtechnologies.com/products/xtrade_full.html.

U.S. Appl. No. 10/403,881, filed Mar. 31, 2003, Schluetter et al.

"A System and Method for Conducting Security Transactions Over a Computer Network", Mauro & Buist, Mar. 1, 1999, DX 196, eS 066150-eS 066229, DTX 196.

A. Klein, WallStreet.com—Fat Cat Investing at the Click of a Mouse, Ch. 14-15, 1998; Exhibit 16.

Allen, A., and Zarembo, L., "The Display Book: The NYSE Specialists' Electronic Workstation" in The Challenge of Information Technology for the Securities.

Markets: Liquidity, Volatility, and Global Trading, Eds. Henry C. Lucas Jr. And Robert A. Schwartz, p. 205-213, alleged available as of 1989, G0176623-G0176633.

Amazon.com Catapults Electronic Commerce to Next Level with Powerful New Features,' Amazon.com Press Release, Sep. 23, 1997, DTX1034, DezmelykOOO012-13.

Annexes A and B of TT Reply Brief, received by European Patent Office on Oct. 3, 2006.

Apple Advertisement, Scientific American, Sep. 1984, Scientific American Inc. NY, NY DezmelykOOO014-33, DTX1035.

APT Trading Procedures (ATOM Version) of LIFFE, Apr. 3, 2001, Opposition EP 1 319211 B1 Exhibit 9B.

APT User Guide, Jan. 1994, DX 152, LIFFE 000262-LIFFE 000363, DTX 152.

APTplus Trading Procedures, Dec. 28, 1995, Opposition EP 1 319211 B1 Exhibit 9D.

Aurora Chicago Board of Trade Brochure, 1990, E50021230-E50021241.

Australian Patent Office Search and Examination Report for Singapore Patent Application No. 200405020-9 dated Aug. 2, 2007, mailed Aug. 7, 2007.

Automated Trader Journal, Q4 2007, alleged available as of Oct. 1, 2007, DDX_Buhannic 010.

BNA, Inc. Securities Regulation & Law Report, "Possibility of 'After Hours' Trading Raises Liquidity, Other Concerns for SEC" vol. 31, No. 16, Apr. 23, 1999, ISSN 1522-8797 [Retrieved from the Internet at http://pubs.bna.com on Apr. 19, 2007], DDX 550.

Broker Workstation handwritten notes, alleged available as of Mar. 1, 1991, G0173819-0173920.

Building for Excellence', MINEX Brochure, DTX 1153, Silverman000330-Silverman000334, alleged available as of May 1, 1992.

Buist invoice to eSpeed, alleged available as of Feb. 8, 2006, PDX 955.

Cahier de charges.doc, Feb. 9, 1999, G0111752-G0111758.

CBOT Broker Workstation Functional Specification, alleged available as of Mar. 6, 1991, G0173785-0173818.

Chart re DSM QA Test Plain—project plan in progress, DX 432, DTX 432, Nov. 4, 1998.

Chicago Mercantile Exchange (CME) Brochure, DTX1163, Silverman000406-Silverman000407, alleged available as of Feb. 1, 1997.

Chicago Mercantile Exchange, CUBS (CME Universal Broker Station) Brochure, alleged available as of Feb. 1, 1997, CME-E0000699-0000700.

(56) References Cited

OTHER PUBLICATIONS

Clemons, E., and Weber, B., "Alternative Securities Trading Systems: Tests and Regulatory Implications of the Adoption of Technology," Information Systems Research, vol. 7, No. 2, alleged available as of Jun. 1996, G0031593-0031618.
CME Group, CME Globex Access Directory, alleged available as of Jan. 1, 2008, G0137650-0137727, DDX_Buhannic 011.
Comparison of BTQPane.java files, alleged available as of Jun. 18, 1998, PDX 957.
Court's ruling on no prior sale dated Aug. 27, 2007.
CQG, LLC's and CQG, INC.'s Initial Invalidity and Unenforceability Contentions, Civil Action No. 05-cv-4811, dated Jul. 23, 2012.
CQG's Final Invalidity Contentions, Case No. 05-cv-4811, dated May 10, 2013.
Credit Suisse First Boston, PrimeTrade promotional materials and press releases, alleged available as of Jan. 19, 1999, CSFB000036-000046, PDX_Buhannic 001.
Decision on Appeal issued by United States Court of Appeals for the Federal Circuit in *Trading Technologies International, Inc.* v. *Open E Cry, LLC*, Case 2012-1583, dated Aug. 30, 2013.
Declaration of Brian Schneider, Apr. 4, 2011, G0186079-0186081.
Declaration of Gregory Veselica, Mar. 30, 2011, G0186082-0186084.
Declaration of Thomas Cooper, Mar. 22, 2011, G0186076-0186078.
Declaration of W. Buist re: WIT DSM System, Apr. 26, 2006, PX 365, DTX 1777.
Declaration of Walter Buist, Exhibit 17, Apr. 26, 2006; with Faxed Signature Page.
Defendant GL Trade Americas, Inc's Supplemental Responses and Objections to Interrogatory Nos. 5,17, and 18, Jul. 24, 2006.
Deposition testimony of Amy Watson dated Jun. 12, 2007 with DDX 626A; DDX 700 and POX 636.
Deposition testimony of Atsushi Kawashima [4023] dated Nov. 21, 2005 with DDX 178-185.
Deposition testimony of Barbara Wattiez dated Jun. 16, 2007 with DDX 719-723.
Deposition testimony of Bautz, William dated Apr. 20, 2007 with DDX 550.
Deposition testimony of Bruno Spada dated Apr. 30, 2007 and May 2, 2007 with DDX 384-385; DDX 519-21; DDX 537-38; DDX 579-580; DDX 522; DDX 538; PDX 493-495; PDX 519-522.
Deposition testimony of Buhannic, Philippe dated Dec. 6, 2011 with DDX_Buhannic 001, 003, 004a, 006, 009, 010, 011, 013, 014, 015; PDX_Buhannic 001-002.
Deposition testimony of Buist, Walter dated Jun. 11, 2009 with PDX 950-955, 957-958; PDX 365.
Deposition testimony of Christopher Buist [7002] dated Jun. 22, 2006 with POX 358-364 and DDX 283-284.
Deposition testimony of Christopher Malo [6179] dated May 23, 2007 with DDX 524.
Deposition testimony of Cristina Dobson [5032] dated May 18, 2007 with DDX 625-635; DDX 637; POX 533 and POX 535.
Deposition testimony of Feltes, David dated Jan. 24, 2007 with PDX_Feltes 002.
Deposition testimony of Fred Mastro [6182] dated May 21, 2007 with DDX 638; POX 538; POX 540-543.
Deposition testimony of Greenstein, Mark dated Feb. 24, 2011 with DDX_Greenstein 003, 008.
Deposition testimony of Havard, Laurent dated Nov. 14, 2012; Errata dated Dec. 7, 2012.
Deposition testimony of Hiroyuki Kida [4002] dated May 17, 2007 and May 18, 2007 with DDX 617-624, POX 519-524 and POX 531.
Deposition testimony of Jean Cedric Jollant [6088] dated Apr. 26, 2007 and Jun. 13, 2007 with DDX 384; DDX 517; DDX 520; DDX 551-568; DDX 575-577; PDX 465-483.
Deposition testimony of Josephine Sheng [6196] dated Jun. 26, 2007 with DDX 520; DDX 522; DDX 536; DDX 575; POX 493; POX 683-683a; POX 775.
Deposition testimony of Laurent Havard dated Apr. 24-26, 2007, May 12, 2007, Jun. 21, 2007 and Sep. 5, 2007 with DDX 506; DDX 508; DDX 517; DDX 539; DDX 551-568; DDX 570-573; DDX 575; DDX 603; POX 462; POX 464-483; POX 767-769; POX 771-774; POX 875-877; POX 882-888 and POX 893.
Deposition testimony of Marc Lorin [6173] dated Sep. 5, 2007 with DDX 385; DDX 721-722; DDX 730.
Deposition testimony of Marcel Tchitchiama dated May 10, 2007-May 11, 2007 with DDX 156-157; DDX 168; DDX 384-85; DDX 538; DDX 592-93A; DDX 595-98; DDX 602-06; DDX 608-11 DTX 494; POX 503; POX 506; POX 612.
Deposition testimony of McCausland, Robert dated Apr. 7, 2005 with DDX 111-114.
Deposition testimony of Michael Cartier [5022] dated May 9, 2007 with DDX 587-588; DDX 592-593A and POX 498-500.
Deposition testimony of Michael Glista [5049] dated Feb. 20, 2007 with DDX 382-386.
Deposition testimony of Neil Treloar dated Jun. 19, 2007 with DDX 384; DDX 539-39A; DDX 724; DDX 726; POX 492; POX 750-752.
Deposition testimony of Nicholas Garrow [5077] dated Jun. 14, 2007 with DDX 116 and DDX 592.
Deposition testimony of Peake, Junius dated Jun. 3, 2005 with DDX 121; Errata dated Jul. 26, 2005.
Deposition testimony of Philip Carre [4035] dated Jun. 22, 2007, Sep. 6, 2007 & Sep. 13, 2007 with DDX 384-385; 473; 494; 527; 537-541; 592; 593A; 595-598; 605; 626; 629; 719-723; 728-732; 897-898; 896.
Deposition testimony of Spada, Bruno dated Dec. 19, 2012.
Deposition testimony of Steiner, Erik dated Mar. 8, 2011 with DDX_Steiner 001, 003-005; Errata dated May 5, 2011.
Deposition testimony of Stengard, Mats dated Oct. 25, 2011 with DDX_Stengard001-003; Errata dated Nov. 25, 2011.
Deposition testimony of Villain, Michael dated Oct. 11, 2011 with DDX_Villain001, 002, 006, 011, 012.
Deposition testimony of Walter Buist [7013] dated Jun. 23, 2006 with DDX 315; POX 310-315; POX 365 and POX 368-370.
Deposition testimony of Wille, Mark dated Jun. 29, 2011 with DDX_Wille 002, 010, 011.
Deposition testimony of William McHorris [6192] dated Apr. 10, 2007 with POX 416-417.
Deposition testimony of Yarovsky, Tina dated Apr. 13, 2007 with DDX 474.
Deposition Transcript of Atsushi Kawashima [8021], Nov. 21, 2005, Opposition EP 1 319 211 B1 Exhibit 3.
Deposition Transcript of Paul MacGregor, Nov. 1, 2005, Opposition EP 1 319 211 B1 Exhibit 9A.
Deutsche Borse Group, DTB Member Manual Trading, Description of the Screens, Eurex 1.0/DTB 5.0 Version 01 May 11, 1998, E0000144-0000305.
Digital trading facility weekly operations meeting outline, DX 444, DTX 444, CM 006661, May 10, 1999.
Directory of Software Solutions for LIFFE Connect, 02/0099, DX 156, DTX 156.
Directory of Software Solutions for LIFFE Connect, Issue 1, Oct. 1998, DX 155, DTX 155.
Directory of Software Solutions for LIFFE Connect, Issue 3, Jun. 10, 1999, DX 157, DTX 157.
Dow Jones & Reuters Factiva, 'Date Broadcasting Partners with Alltech Investment to Provide Customers with Online Trading', Feb. 25, 1999, E8.
Dow Jones & Reuters Factiva, 'Firms Rush to Make LIFFE Connect Decision', Dec. 4, 1998, E6.
Drawing of 1997 TSE terminal by H. Kida, DX 624, DTX 624.
dsmChanges.txt, alleged available as of Feb. 3, 2006, PDX 958.
Ecco Consulting Study Report MEFF Software Systems, Mar. 17, 1999, ES0060578-ES0060591.
Edo User Guide Release 1.10.1, The Global Order Routing and Order Execution System, alleged available as of May 7, 1997, G0049458-0049531, DDX_Buhannic 015.
Email from J. Damgard to FIA Board of Directors re FIA Subcommittee on Intellectual Property, alleged available as of Nov. 3, 2004, FIA0008, PDX_Buhannic 002.

(56) References Cited

OTHER PUBLICATIONS

Email from Patricia Gauthier to Sam Page, Jan. 25, 1999, G0119377-G0119380.
Email from Wattiez to M. Cartier attaching Matif VF: V4.50 manual, Mar. 30, 1998, DX 592, MC000046-MC000116, DTX 592.
English Translation of Tokyo Stock Exchange Offer Form, Apr. 18, 2005.
EPO Comments to Opposition to European Patent EP 1319211 dated Dec. 1, 2010 (67 pages).
eSpeed and Ecco's Supplemental Answers to Plaintiff's First, Third, Seventh, Eighth, and Ninth Set of Interrogatories, May 25, 2007.
eSpeed's and Ecco's Answers to Plaintiff's Eighth Set of Interrogatories, Aug. 4, 2006.
eSpeed's Disclosure of Invalidity Contentions Pursuant to 35 USC 282, May 25, 2007.
eSpeed's Objections and Answers to Plaintiff's Third Set of Interrogatories to Defendant eSpeed, May 12, 2005.
eSpeed's Supplemental Invalidity Contentions, May 25, 2007.
eSpeed's Answers to TT's Eighth Set of Interrogatories, Interrogatory No. 22, Case No. 04 C 5312, dated Aug. 4, 2006.
Euro Servisen customers screen layout, hand drawn, alleged available as of Apr. 20, 2011, DDX_Gemon 001.
European Search Report for EP Application No. 04105905.6 dated Mar. 24, 2005, mailed Apr. 1, 2005.
Evenstreet Presentation prepared for Flatiron Partners, 1999, DX 437, CM 007139-CM 007172, DTX 437.
Evenstreet Presentation prepared for National Discount Brokers, 1999, DX 301, CM 006787-CM 006817, DTX 301.
Faxed copy of German Document from Tick-It GmbH Filing New European Opposition, Jan. 13, 2006.
Fig.2 Substitute Sheet (Rule 26), Opposition EP 1 319 211 B1 Exhibit 13A, Mar. 2, 2000.
Final Detailed Design Document NYMEX ACCESS, May 5, 1992, eSOO03127-eSOO03541.
Front Capital Systems AB, OPTRADE User Manual, Version 1.70, alleged available as of Jan. 1, 1991, G0175926-G0175955.
Functional Enhancements for LIFFE CONNECT for FUTURES Project, Mar. 3, 1999, G0119742-G0119745.
Functional Enhancements for LIFFE CONNECT for FUTURES Project, Apr. 12, 1999, G0119718-G0119724.
Functional Enhancements for LIFFE CONNECT for FUTURES Project, Apr. 12, 1999, G0119725-G0119732.
Futures/Options Trading System Guidelines for Operating the Trading Terminals, TSE Business Systems Dept., TSE00628-643, e5062278-e5062293, D1 (3), alleged available as of Aug. 1, 1998.
GATElab, webpage of product offerings, alleged available as of Jan. 1, 2011, DDX_Villain 012.
German Document from Tick-It GmbH Filing New European Opposition, Jan. 14, 2006.
GL and SunGard's Supplemental Objections and Responses to TT's Interrogatories, Case No. 05-cv-4120, dated Mar. 8, 2013, Redacted, Non-confidential portions only.
GL Brochure, G0021652-21658, alleged available as of Jan. 1, 1998.
GL Cost and Services, 1998, G0108876.
GL Enhancements Software Version 4.11 f, Oct. 29, 1998, G0060853-G0060854.
GL Enhancements Update, Jan. 27, 1999, G0101682-G0101688.
GL Product Leaflet Re: Mosaic, G0022529-22530, alleged available as of Jan. 1, 2001.
GL Trade Checklist-Installation Requirements for FUTURES, Jan. 1999, G0119795-G0119798.
GL Trade Presentation (French), Apr. 25, 1999, G0118989-G0119044.
GL Trade User Guide for Globex2, alleged available as of Apr. 1, 1999, CME-E0014287-0014489.
GL Trade, CAC and Stoxx Futures on MATIF NSC VF, User Information Notes, pp. 1-14, published by GL Trade, London, England, Mar. 15, 1999.
GL Trade, GL Win Version 4.50 Note d'information, alleged available as of Mar. 3, 1999, G0108715-0108751, DDX_Villain 006.
GL Trade, GLNEGO Version 4, alleged available as of Feb. 1, 1999, G0123387-0123447.
GL Trade, LIFFE Connect for Futures, User Guide v4.50, published by GL Trade, London, England, Feb. 1999, pp. 1-39.
GL Trade, LIFFE Connect for Futures, User Guide v4.50, published by GL Trade, London, England, Mar. 1999, pp. 1-39.
GL Trade, LIFFE Connect for Futures, User Guide v4.51, published by GL Trade, London, England, Jun. 1999, pp. 1-57.
GL Trade, LIFFE Connect for Futures, User Guide, v4.50 Beta, published by GL Trade, London, England, Jan. 1999, pp. 1-24.
GL Trade, Matif VF: V4.50, alleged available as of Mar. 30, 1999, G0123140-G0123209.
GL Trade, Note d'information d'utilisation de GLWIN pour le passage des futurs CAC et STOXX sur NSC VF (French-language document); Informational notice of use on GLWIN (with Trade Pad) re Stockwatch and GLNego equivalents, alleged available as of Mar. 9, 1999, G0111620-G0111634.
GL Trade, User Guide V4.50, LIFFE Connect for Futures by GL Trade, alleged available as of Mar. 1999, G-RP0123448.
GL Trading Pad Manual, G0020819-G0020826, alleged available as of Aug. 12, 1999.
GL Version 4.70 (English Version), Jan. 5, 2000, G0020593-20621.
GL Version 4.70 (French Version), Jan. 5, 2000, G0026505-26533.
GL WIN and Related Software Manual, 2) G0025942-26267, alleged available as of Feb. 4, 1999.
GL WIN and Related Software Manual, 3) G010239-10610, alleged available as of Sep. 11, 2000.
GL WIN and Related Software Manual, Sep. 11, 2000, 1) G0025251-25615.
GL WIN et Logiciels complementaires (French), G0009495-9874, alleged available as of Sep. 11, 2000.
GL WIN et Logiciels complementaires (French), Jul. 1999, G0009875-G0010238.
GL WIn et Logiciels complementaires (French), Oct. 1999, G0009121-G0009486.
GL WIN Summary (French), Jun. 1998, G0091004-G0091046.
GL WIN Version 4.50, Mar. 3, 1999, DX 538, G 107459-G 107480, DTX 538.
GL WIN Version 4.51, G0118856-G0118865, alleged available as of Jun. 2, 1999.
GLOBEX Members Handbook, Jun. 1992, DX632, DTX632, e50069744-e50069818.
GLOBEX Users Guide, Jan. 1997, DDX 633, DTX 633, Es0069819-eS0070081.
Great Britain Search Report on GB Application No. 02193068.8 dated Nov. 27, 2002.
Handwritten diagram re INTEX screen, alleged available as of Apr. 7, 2005, DDX 112.
Handwritten document entitled pre '92 and post '92 with figures, alleged available as of Mar. 8, 2011, DDX_Steiner 003.
Handwritten document with drawing and figures, alleged available as of Mar. 8, 2011, DDX_Steiner 001.
Handwritten document with x's and lines, alleged available as of Feb. 24, 2011, DDX_Greenstein 003.
Handwritten document with XYZ and numbers, alleged available as of Mar. 8, 2011, DDX_Steiner 004.
Information Offer Form, Apr. 18, 2005.
Installation, Market Entry Test, and Technical Dress Rehearsal Summary, Feb. 23, 1999, G0119746-G0119750.
Interactive Brokers, 'Trade Futures Online with Interactive Brokers', May 9, 2005, e50032571-e50032572.
Internal Product News doc on QuickTrade, G0020468-20471, alleged available as of Jan. 1, 2001.
International Preliminary Examination Report on PCT Application No. PCT/US01/06792 dated Apr. 9, 2002, mailed Apr. 12, 2002.
Intex Project Specifications, alleged available as of Jul. 22, 1985, eS0024917-0024950, DDX 114.
INTEX, Functional Specifications, alleged available as of Aug. 1981, eS0003547-0003616, DDX 113.
Introducing the Company: GL Trade' product offerings and slide presentation (to Reuters), G0026534-26559, alleged available as of Jul. 26, 1999.

(56) References Cited

OTHER PUBLICATIONS

Invalidity Contentions Re: TradePad Module (Letter Dated May 25, 2007).
Iris Investment Support Systems Window Ad, Opposition EP 1 319211 B1 Exhibit 10, Jun. 1, 1999.
Keyboard example, Feb. 3, 2006, G007308-G007310.
Kollock, P. "Market Morphing" Futures Industry Magazine, vol. 7, No. 7, p. 15-17, alleged available as of Oct. 11, 1997, G0116279-0116361, DDX_Villain 002.
Letter from EPO to TT Enclosing European Patent Oppositions [8015], Jan. 25, 2006.
Letter from EPO to TT Re: Five Recently Filed European Patent Oppositions [8014], Feb. 21, 2006.
Letter from EPO to TT Re: Further European Patent Opposition [8013], Feb. 23, 2006.
Letter from J. Walaski to the EPO Re: Change of Address, Dec. 19, 2006.
Letter from W. Buist to G. Fishman re tasks performed for TT project, alleged available as of Jun. 12, 2006, PDX 954.
Letter to EPO from Karl Barnfather Enclosing Notice of Opposition (form 2300.1) and Grounds of Opposition (Annex 1), Jan. 12, 2006.
Letter to J. Walaski from EPO Re: Decision to Grant TT Patent, Mar. 3, 2005.
Letter to J. Walaski from EPO Re: Payment, Apr. 20, 2005.
LIFFE CONNECT for Equity Options User Guide v4.30, Nov. 1998, G0119052-G0119086.
LIFFE CONNECT for Futures leaflet, G0023885-23888, alleged available as of Jan. 20, 1999.
LIFFE CONNECT for Futures Schedule for Project Deliverables, Feb. 4, 1999, G0119681-G0119682.
LIFFE CONNECT for FUTURES User Guide v4.5, Jun. 1999, G0025751-25806.
LIFFE CONNECT for FUTURES: Project Summary: Apr. 19, 1999, G0119705-G0119717.
LIFFE CONNECT for FUTURES: Project Update 2, Meeting of Feb. 10, 1999, G0119698-G0119704.
LIFFE CONNECT for Futures—Project Update 1, Meeting of Jan. 11, 1999, G0119691-G0119697.
LIFFE CONNECT FUTURES Functional Technical Issues to Resolve, Apr. 12, 2007, G0119049-G0119050.
LIFFE Connect Futures Release Note 050399.doc, Mar. 3, 1998, G0111402-G0111407.
LIFFE CONNECT ISV CIRCULAR No. 001.99, Jan. 15, 1999, G0119617-G0119618.
LIFFE CONNECT ISV CIRCULAR No. 001.99, Jan. 8, 1999, G0119566-G0119568.
LIFFE CONNECT ISV CIRCULAR No. 004.99, Jan. 15, 1999, G119615-G0119616.
LIFFE CONNECT ISV CIRCULAR No. 008.98, Dec. 28, 1998, G0119631-G0119632.
LIFFE CONNECT ISV CIRCULAR No. 14.99, Mar. 2, 1999, G0119583-G0119590.
LIFFE guide/pamphlet, DX 148, DTX 148, alleged available as of Jan. 1, 1994.
LIFFE, The Application Program Interface (API) Reference Manual for LIFFE Connect, Release 3.1, alleged avlailable as of Sep. 1998, G0023004-0023068.
LIFFE's New Electronic Trading Platform for Futures, LIFFE 202-261, Opposition EP 1319211 B1 Exhibit 8D, Sep. 24, 1998. 9/24/98.
Marion, L. "The paperless exchange" Institutional Investor, vol. 20, No. 4, black and white, alleged available as of Apr. 1986, DDX_Steiner 005.
Marion, L. "The paperless exchange" Institutional Investor, vol. 20, No. 4, color, alleged available as of Apr. 1986, G0157750-0157755, DDX_Wille 002.
Mauro, U.S. Appl. No. 09/292,552, Apr. 15, 1999, DX 209, eS 065994-eS 066149.
Meeting outline, DX 428, CM 00750-CM 007501, DTX 428, Sep. 11, 1998.
MEFF Renta Fija Manual, DTX 1165, Oct. 1997, SilvermanOO0410-SilvermanOO0473.
Megumi Miyoshi, Japanese Patent Application No. 20010564025, Apr. 18, 2000 (published as JP2004504652) (English translation provided).
Member Participation in the Futures Market, Apr. 12, 1999, G0119196-G0119197.
Memo Re: Downloading the Terminal Program, Aug. 18, 2005.
Memo Re: Dual Access Version 4.5 release, Mar. 21, 1999, G0022956-G0022959.
Memo Re: Futures/Options Trading System and Japanese Patent Application No. 2001-564025 (Japanese), Aug. 18, 2005.
Memo to Distribution from R. McCausland re: Open Spread Development; Memo to E. Brian from McCausland re: the Full Intex Network & Trading System Components, M1—M17, alleged available as of MAy 29, 1984, DDX 111.
Memorandum Opinion and Order issued by Judge James B. Moran in Case 1:05- cv-04088, *Rosenthal Collins Group, LLC,* vs. *Trading Technologies International, Inc.*, May 16, 2007, PDX 950.
Memorandum Opinion and Order issued by Judge Virginia M. Kendall in *Trading Technologies International, Inc.* v. *BCG Partners, Inc.*, Case 1:10-cv-00715, dated Feb. 9, 2012.
Memorandum Opinion and Order Re: '132 and '304 Claim Construction [425], Oct. 31, 2006.
Memorandum Opinion and Order Re: Court Reaffirming Priority dated Jan. 3, 2008.
Memorandum Opinion and Order Re: Defendant's Motion for Judgment as a Matter of Law on Indefiniteness [1141], Jan. 2, 2008.
Memorandum Opinion and Order Re: Defendant's Motion for Judgment as a Matter of Law on Willfulness [1144], Jan. 3, 2008.
Memorandum Opinion and Order Re: eSpeed's Motion for Summary Judgment of Invalidity Denied [845], Aug. 21, 2007.
Memorandum Opinion and Order Re: Gl's Motion for Reconsideration Denied [994], Sep. 19, 2007.
Memorandum Opinion and Order Re: Inequitable Conduct dated May 6, 2008.
Memorandum Opinion and Order Re: Motions for Reconsideration [875], Aug. 27, 2007.
Memorandum Opinion and Order Re: No prior use dated Aug. 16, 2007.
Memorandum Opinion and Order Re: Non-Infringement [708], Jun. 20, 2007.
Memorandum Opinion and Order Re: Preliminary Injunction [83], Feb. 9, 2005.
Memorandum Opinion and Order Re: Prior Public Use [835], Aug. 16, 2007.
Memorandum Opinion and Order Re: Priority Date [1013], Sep. 25, 2007.
Memorandum Opinion and Order Re: Priority Date [769], Jul. 12, 2007.
Memorandum Opinion and Order Re: 'Single Action' Ruling [963], Sep. 12, 2007.
Memorandum Opinion and Order Re: TT's Motion for Clarification [475], Feb. 21, 2007.
Memorandum Opinion and Order Re: TT's Motion to Preclude Prior Sale Defense Denied [873], Aug. 27, 2007.
Midas Kapiti Delivery Note and Release Note—Market Trader V5.2b, Mar. 31, 1999, DX 619, G 096511-G 096527, DTX 619.
Midas Kapiti Delivery Note and Release Note—Market Trader V5.2e, DX 623, G 105641-G 105667, DTX 623, May 24, 1999.
Midas Kapiti Release Notes—Market Trader V5.2, DX 621, G 096712-G 096727, DTX 621, May 26, 1999.
Midas Kapiti Release Notes—Market Trader V5.2e, Apr. 12, 1999, DX 620, G 096694-G 096711, DTX 620.
Midas Kapiti Release Notes—Market Trader V5.2e, DX 622, G 096728-G 096754, DTX 622, Jun 1, 1999.
Midas-Kapiti International, Market Trader, Nikkei 225 & Nikkei 300 Index Options and Index Future Trading Users Guide, v1.3, alleged available as of Dec. 18, 1997, G0100463-0100481.
Midas-Kapiti International, Release Notes, Market Trader v.5.2e, alleged available as of May 24, 1999, G0105642-G0105667.
Minex Service Outline User Test/Orientation, Sep. 1992, e50064647-e50064670.

(56) References Cited

OTHER PUBLICATIONS

Munshi, Jamal Huq. "The Impact of Information Technology on Securities Markets: Evidence from the New York Stock Exchange," PhD dissertation, University of Arkansas. Ann Arbor: ProQuest/UMI, Order No. 9237410, alleged available as of Jan. 1, 1991, G0147878-G0148049.
New York Stock Exchange, Display Book User Reference, alleged available as of Jan. 1, 1992, G0146068-G0146243.
New York Stock Exchange, Floor Operations Display Book Guide, Version 3.1, alleged available as of May 1998, G0145920-G0146065, DDX_Wille 011.
New York Stock Exchange, Portions of 1984 and 1985 Annual Reports, alleged available as of 1984, G0146656-G0146659.
New York Stock Exchange, Release 2.1 Display Book, alleged available as of Nov. 1, 1996, G0146649-0146650. DDX_Wille 010.
Nicholas Economides, 'Electronic Call Market Trading', Journal of Portfolio Management, Feb. 1995, e50069585-e50069610.
Notes re final additions/revisions, DX 435, CM 007949-CM 007955, DTX 435, Apr. 2, 1999.
Notice of Opposition to a European Patent by Deutsche Borse AG Jan. 12, 2006.
Notice of Opposition to a European Patent by EccoWare Ltd., Jan. 13, 2006.
Notice of Opposition to a European Patent by Rosenthal Collins Group LLC, Jan. 12, 2006.
Notice of Opposition to a European Patent by Tick-It GmBh, Jan. 13, 2006.
Notice of Opposition to a European Patent EP 1319211 B 1, AN ITRA Medienprojekte GmbH, Jan. 13, 2006.
Notification of Docket Entry Re: Defendant eSpeed's Motion for a New Trial is denied [1142], Jan. 3, 2008.
Notification of Docket Entry Re: Defendants eSpeed's Motion for Judgment as a Matter of Law on Invalidity is denied [1140], Jan. 3, 2008.
Notification of Information Offer Form, Jun. 3, 2005.
O'Hara and Oldfield, 'The Microeconomics of Market Making', Journal of Financial and Quantitative Analysis, Dec. 1986, DTX 1169 Silverman000478-SilvermanOO0493.
OM Click Trade User's Guide for Windows NT, Oct. 1998, eS00064671-eS00064773.
OM Click Trade User's Guide for Windows NT, including Addendum for HKFE, alleged available as of Oct. 1998, G0046709-0046816, DDX_Stengard 003.
OM, The OM Click Trade User Guide for Windows NT, alleged available as of Nov. 1997, G0202935-0203019, DDX_Stengard 002.
Open E Cry, LLC's Initial Invalidity Contentions, Case No. 1:10-cv-00885, dated Oct. 19, 2010.
Opposition Trading Technologies, Inc. Application No. 01920183.9 EP 1319211 B1, Exhibit 4 (Japanese and English Versions), Sep. 1997.
Opposition TT, EP 1 319211 B1, Copy set 1, Annex One—Grounds of Opposition [8020], Jan. 19, 2006.
ORC Instructions for Use Version 2.2.8., 1999, eS0064775-eS0064787.
Osaka Securities Exchange (Japanese-language document), alleged available as of Jan. 1, 1997, G0046918-0046937.
Osaka Stock Exchange Manual (Japanese Document), Apr. 1996, REFC00009773- REFC00009826.
Overview re Digital trading facility, DX 443, CM 006315-CM 006344, DTX 443, alleged available as of Jan. 1, 1999.
Overview re SPATS; the Electronic Broker, DX 446, DTX 446, alleged available as of Jun. 26, 1986.
P.O.S. Display Book, Release 2.0: Screen Components Navigation & Layout, User Requirements Specification, alleged available as of Mar. 28, 1995, G0153405-0153428, DDX_Greenstein 008.
Patsystems News Rel. Nov. 6, 2000.
Philpot, J., and Peterson, C. "Improving the Investments or Capital Markets Course with Stock Market Specialist," Financial Practice and Education, Fall/Winter 1998, alleged available as of 1998, G0075378-0075384.

Photo of trader w/ APT screen, DX 151 , LIFFE 00167—LIFFE 00168, DTX 151, alleged available as of Mar. 1, 1994.
Photocopy of Disks containing exhibits A (disk alleged available as of Nov. 3, 1998) and B (disk alleged available as of Mar. 16, 1999) to declaration of W. Buist, PTX366, Jun. 23, 2006.
Piantoni, R., and Stancescu, C. "Implementing the Swiss Exchange Trading System," Proceedings of the 27th International Symposium on Fault-Tolerant Computing (FTCS), alleged available as of 1997, G0077767-G0077771.
Position paper: On-line training and customer acquisition; WIT Capital DSM product launch and related schedule to E. Lang, DX 436, DTX 436, CM 006580-CM 006590, Feb. 22, 1999.
Presentation re WIT Capital Digital stock market Phase 1 usability and customer response testing: Preliminary report of findings, DX 429, CM 007446-CM 007466, May 1, 2006.
Presentation re WIT DSM user interface Trade4.ppt, Oct. 12, 1998, DX 430, CM 008265-CM 008330, DTX 430.
PrimeTrade's application window, alleged available as of Jun. 22, 1998, DDX_Buhannic 004a.
PrimeTrade's application window, alleged available as of Jun. 22, 1998, G0080109-0080110, DDX_Buhannic 003.
U.S. Appl. No. 60/186,322, Certified Copy dated May 18, 2011, Opposition EP 1 319211 B1 Exhibit 13B.
U.S. Appl. 60/678,106, filed May 4, 2005, by Rosenthal et al., RCG-TT0146847.
U.S. Appl. No. 60/736,353, filed Nov. 13, 2005, by Mackey et al., RCG-TT0146879.
PTS Client Version 2.1 F, DX 119, PATS 00067-PATS 00082, DTX 119, alleged available as of Mar. 1, 1998.
PTS trading application Version 1.1 Beta H.1, Mar. 31, 1998, DX 118, PATS 00560-PATS 00560, DTX 118.
QuickTrade Document and Brochure, G021027-21031, alleged available as of Aug. 23, 2001.
RCG Expert Declaration of W. Buist in Case 1:05-cv-04088, *Rosenthal Collins Group, LLC*, vs. *Trading Technologies International, Inc.*, Apr. 26, 2006, PDX 365.
RCG Expert Declaration of Walter D. Buist in Case 1:05-cv-04088, *Rosenthal Collins Group, LLC*, vs. *Trading Technologies International, Inc.*, Sep. 29, 2006, PDX 952.
RCG's Presentation re Wit Capital, Apr. 22, 2004, DX 208, RCG 000635-RCG 000663, DTX 208.
REFCO English Translation of Tokyo Stock Exchange, Publication 1, 'Next-Generation Futures Options Trading System' (participants seminar materials), Sep. 1997.
REFCO English Translation of Tokyo Stock Exchange, Publication 2, 'Futures/Options Trading System Guidelines for Operating the Trading Terminals' (participants seminar materials), Aug. 1998.
REFCO English Translation Tokyo Stock Exchange, Publication 3, 'Tokyo Stock Exchange 50th Anniversary Book of Materials', Jul. 31, 2000.
Release Form for Sachs Communications Group, alleged available as of Sep. 15, 1998, DDX 204.
Release Form for Sachs Communications Group, alleged available as of Sep. 16, 1998, DDX 206.
Release Notes—Market Trader V5.2a, Mar. 18, 1999, DX 617, G 118137-G 118152,DTX617.
Sachs Communication Group Release Form, alleged available as of Sep. 14, 1998, SACHS000055, DDX 202.
Sachs Communications Group Invoice to Mauro Designs, alleged available as of Oct. 20, 1998, SACHS000050-000051, DDX 197.
Sachs Communications Groups Client Sign-In Checklist, alleged available as of Sep. 14, 1998, SACHS000054, DDX 201.
Sachs Communications Groups Client Sign-In Form, alleged available as of Sep. 14, 1998, SACHS000053, DDX 200.
Sachs Communications Groups Client Sign-In Form, alleged available as of Sep. 15, 1998, SACHS000015, DDX 203.
Sachs Communications Groups Client Sign-In Form, alleged available as of Sep. 16, 1998, SACHS000027, DDX 205.
Sample screens of APT system, DX 150, DTX 150, alleged available as of Jan. 1, 1993.
Schroeder, M. "After-Hours Trading is Coming" Investor Relations Business, Mar. 15, 1999, DDX 550.

(56) References Cited

OTHER PUBLICATIONS

Schroeder, M. "Eclipse's After-Hours Trading Service Due to Debut This Summer" Web Finance, Mar. 15, 1999, DDX 550.
Schroeder, M. "Knight to Offer After-Hours Trading" Web Finance, Mar. 29, 1999, DDX 550.
Schwartz, R., and Weber, B. "Next-Generation Securities Market Systems: An Experimental Investigation of Quote-Driven and Order-Driven Trading" Journal of Management Information Systems, vol. 14, No. 2, p. 57-59, alleged available as of Fall 1997. CME-E0000786-0000808.
Screen No. 100-Order Book & Order Entry 1 (Single View), e5060637-e5060639, alleged available as of Apr. 1996.
Screenshot of C:\ drive, alleged available as of Apr. 18, 2006, PDX 951.
Screenshot of filepath L:\java\com\witcapital\dsm\client, alleged available as of Nov. 3, 1998, PDX 953.
Screenshot of GL TradePad, G0119660, alleged available as of Jan. 26, 1999.
ScreenShots: Patsystem "Canned" Demo, Feb. 1997, DX 120, PATS 00545-PATS 00559, DTX 120.
Securities Industries News, 'TT Upgrades Software Platform', Aug. 28, 2000 (D6).
SISS Functional specifications version 2.1, Feb. 16, 1988, DX 445, DTX 445.
SPATS (Security Pacific Automated Trader System), The Electronic Broker, User Manual, alleged available as of Jun. 26, 1986, WF005924-WF005964.
'Specialist vs. Saitori: Market-Making in New York and Tokyo', Richard Lindsay and Ulrike Schaede, DTX 1170, 7-Aug. 1992, SilvermanOO0494-SilvermanOO0506.
Square, Final Fantasy II Instruction Booklet, alleged available as of Jan. 1, 1991, RCG-TT0146485-0146525.
Status review specialist support system study NYSE, Apr. 10, 1986, DX 447, DTX 447.
Supplemental Invalidity and Unenforceability Contentions of GL, Civil Action No. 05-cv-4120, dated Mar. 8, 2013.
Supplemental Invalidity Contentions Pursuant to 35 U.S.C. 282, Aug. 10, 2007.
Swiss Exchange SWX—TS User Manual, Dec. 31, 1998, DTX 2215, eS0032293-eS0032547.
SWX, Annual Report, 1998, G0048218-0048270.
SWX, Bourse suisse Manuel d'utilisateur TS, v2.0 (French-language document), alleged available as of Aug. 31, 1996, G0079810-0080070, DDX_Buhannic 006.
SWX, Swiss Exchange SWX Presentation, IT Overview, alleged available as of Nov. 2, 1999, G0087803-0087818, DDX_Buhannic 0014.
SWX, The Swiss Exchange: From vision to reality, alleged available as of Dec. 1996, G0048801-0048838.
SWX, The SWX Platform and Associated Systems, alleged available as of May 1, 2006, G0029564-0029633, DDX_Buhannic 009.
System for Buying and Selling Futures and Options Transaction Terminal Operational Guidelines, TSE Business Systems Dept., TSE00647-810, eS0622977-eS062366, D1 (2), alleged available as of Aug. 1, 1998.
Terminal Use Manual—Windows NT Version, Tokyo International Financial Futures Exchange (TIFFE), 1994, Silverman002552-Silverman002616, DTX 1226.
The Application Program Interface (API) Reference Manual for LIFFE Connect, Release 2.7, Sep. 1998, DDX 163, DTX 163, e500059868-e500059958.
The Application Program Interface (API) Reference Manual for LIFFE Connect, Release 3.0, Sep. 1998, DDX 159, DTX 159, e500060055-e500060145.
The Application Program Interface (API) Reference Manual for LIFFE Connect, Release 3.1, Sep. 1998, EP 1 319211 B1 Exhibit 7A, e80060146-e80060237.
The Application Program Interface (API) Reference Manual for LIFFE Connect, Release 3.2, Dec. 1998, DDX 161, DTX 161, e500060239-e500060331.
The Application Program Interface (API) Reference Manual for LIFFE Connect, Release 3.3, Jan. 1999, DDX 162, DTX 162, e500059959-e500060054.
The Complete GLOBEX2 Handbook, Jul. 1998, DX637, DTX637, CME-E014048-CME-E014286.
The Complete GLOBEX2 Handbook, May 1998, DX635, DTX635, CME-E0010679-0010891.
Thomson Financial leaflet, G0022445-22450, Sep. 2003.
TIFFE Internet Article, 'New On-Screen Trading Terminals', E2, Retrieved from the Internet on Oct. 1, 2006.
TIFFE Manual (Japanese Document), Jan. 1996, REFC00010861-REFC00011210.
Tokyo Stock Exchange, Document 1, 'Downloading the Terminal Program and Sending the Replacement for the Guidelines for Operating the Trading Terminals', Jan. 2000.
Tokyo Stock Exchange, Publication 1, 'Next-Generation Futures Options Trading System' (participants seminar materials), Sep. 1997.
Tokyo Stock Exchange, Publication 2, 'Futures/Options Trading System Guidelines for Operating the Trading Terminals', Aug. 1998.
Tokyo Stock Exchange, Publication 3, 'Tokyo Stock Exchange 50th Anniversary Book of Materials', Jul. 31, 2000.
TradePad Instructions (French), G0025748-G0025749, alleged available as of Jan. 11, 1999.
tradepad.txt (French), Mar. 8, 2000, G0025616-G0025618.
TradePad.vsd Document, Feb. 9, 1999, G011169-G0111670.
TradeStation's Initial Invalidity Contentions, Civil Action No. 10-cv-884, dated Oct. 12, 2010.
Trading Pad Document (E3), Jul. 27, 2005.
Trading Pad User Manual, Aug. 10, 1999, DX 539, G 112123-G 112131, DTX 539.
Trading pad.doc Document, Jan. 26, 1999, G0111671-G0111672.
*Trading Technologies International, Inc.*, v. *Ninja Trader, LLC*, Complaint for Patent Infringement and Jury Demand, Jul. 7, 2005, DDX 360.
Trading Technologies Trader System User Documentation, Apr. 1, 1998, Release 3.10, DX 3, TT 015867-TT 015955, DTX 3.
TradingPad.doc, Apr. 30, 1999, G0112117-G0112122.
TradingScreen, FuturesHUB Brochure, alleged available as of Nov. 1, 2007, DDX_Buhannic 013.
Trial testimony of Atsushi Kawashima [4032] dated Sep. 26, 2007 with DTX 183.
Trial testimony of Barbara Wattiez dated Sep. 28, 2007 with DTX 592-593A; DTX 597-598; DTX 718-719; DTX 722.
Trial testimony of Bruno Spada dated Sep. 24, 2007 with DTX 306; DTX 384; DTX 518-522; DTX 524; DTX 575; DTX 579-580; DTX 593; DTX 626; DTX 628; DTX 646; DTX 1899 DTX 2086; DTX 3020-3021; DTX 3058-3059; DTX 3061; DTX 3085; PTX 737; PTX 840; PTX 2083; PTX 2087; PTX 2099; PTX 2101.
Trial testimony of Fred Mastro [6189] dated Sep. 25,2007 with DTX 592.
Trial testimony of Gerard Varjacques dated Sep. 28, 2007 with PTX 509-510 and PTX 513.
Trial testimony of Hiroyuki Kida dated Sep. 28, 2007 and Oct. 1, 2007 with DTX 617.
Trial testimony of Jean Cedric Jollant [6133] dated Sep. 20, 2007 with DTX 157; DTX 473; DTX 719; DTX551-64; DTX598; DTX722; DTX 1903; DTX3009-10; DTX3014; DTX3016-18; DTX 3020; DTX 3023; DTX 3025; PTX 166; PTX 520; PTX 526; PTX 539; PTX 573; PTX 575; PTX 579; PTX 2065.
Trial Testimony of Laurent Havard dated Sep. 21, 2007 with DTX 384; DTX 520; DTX 561-62; DTX 570; DTX 573; DTX 575; DTX 593; DTX 750-52; DTX 3011; DTX 3017-18; DTX 3050; PTX 575; PTX 2064; PTX 2074; PTX 2077; PTX 2079.
Trial testimony of Michael Glista [5055] dated Sep. 24, 2007 and Sep. 25, 2007 with DTX 382-386; DTX 524; DTX 570; DTX 579; DTX 592; DTX 3020; DTX 3050; DTX 3057; DTX 3110; PTX 1993; PTX 2065; PTX 2092; PTX 2094.
Trial testimony of Neil Treloar dated Sep. 21, 2007 and Sep. 24, 2007 with DTX 2040-2042.
Trial testimony of Nicholas Garrow[ 5081] (via expert witness) dated Oct. 2, 2007.

(56) References Cited

OTHER PUBLICATIONS

TSE Japanese Document, pp. 4-15, alleged available as of Aug. 1, 1997.
TSE Japanese Document, pp. 6-15, alleged available as of Aug. 1, 1998.
TSE Manual (Japanese Document), Nov. 15, 2005, DX179, TSE647-995, w/certified translation e562258-62366 [T5E609-647, 694-711, 714-721 , 735-736, 749-756, 759-760, 779-782, 784-810, 982-995].
TT X-Trader Brochure, Dec. 1, 2006 (E7).
Updated negotiations design to E. Lang from C. Mauro for review and approval prior to patent application, DX 434, CM 008410-CM 008414, DTX 434,Jan. 18, 1999.
User Guide V4.60 LIFFE Connect for Futures by GL Trade, Jun. 1999, DX 605, G 123548-G 123603, DTX 605.
User Interface Design for display options design, DX 426, CM 000249-CM 000287, DTX 426, Jul. 8, 1998.
User interface design specification for WIT capital digital stock market, DX 433, DTX 433 CM 008441-CM 008478, Jan. 18, 1999.
Press Release, 'Electronic Patent Application Records Replace Paper Files at USPTO', DTX 2285, Sep. 19, 2007.
Utility Patent Application Transmittal Re: Computer Trading System, Method and Interface, Apr. 15, 1999, Mauro, Kleia, and Buist, DTX368.
Various declarations Re: U.S. Appl. No. 09/292,552, Nov. 3, 2003, DX 284, TT 099877-TT 099907, DTX 284.
Weber, B., "Assessing Alternative Market Structures Using Simulation Modeling," in Global Equity Markets: Technological, Competitive, and Regulatory Challenges, ed. Robert A. Schwartz (New York: New York University, 1995) p. 157-184, alleged available as of 1995, DONEFER003919-003935.
Weber, B., "Elements of Market Structure for On-Line Commerce" in Future Markets: How Information Technology Shapes Competition, C. Kemerer (ed.), Kluwer Academic Publishers, p. 15-32, alleged available as of 1998, CME-E0000809-CME-E0000826.
Weber, Bruce William. "Information Technology and Securities Markets: Feasibility and Desirability of Alternative Electronic Trading Systems," PhD dissertation, University of Pennsylvania. Ann Arbor: ProQuest/Umi, Order No. 9125774, alleged available as of 1991, G0171612-0171925.
Website of EccoWare, Professional Software for Professional Traders, [Retrieved from the Internet at http://www.eccoware.com/products.php on Jan. 23, 2007], alleged available as of Jan. 23, 2007, PDX__Feltes 002.
WIT Capital after hours trading system, Mauro, Mar. 19, 1999, DX 440, CM 009028-CM 009059, DTX 440.
WIT Capital check, alleged available as of Oct. 19, 1998, DDX 199.
WIT Capital Corporation digital trading facility presentation, Mar. 1999, DX 441, DTX 441.
WIT Capital digital trading facility presentation to Goldman Sachs, DX 438, CM 004523-CM 004547, DTX 438, alleged available as of Jan. 1, 1999.
WIT Capital Digital trading facility presentation to PaineWebber, Inc., DX 439, DTX 439, alleged available as of Nov. 11, 1998.
WIT Capital invoice, alleged available as of Sep. 30, 1998, DDX 198.
WIT Capital limit order book to L. Forrest from C. Mauro, DX 425, CM 007382-CM 007411, DTX 425, Apr. 20, 1998.
WIT Capital pdf operator manual for Digital trading facility, 1999, DX 442, CM 00651 O-CM 006513, DTX 442.
WIT Digital Stock Market, User Interface Rev. 9, Exhibit 15, copied on Oct. 16, 2006.
WIT DSM Presentation re Information display and decision variables, Dec. 20, 1998, DX 431, CM 004334-CM 004347, DTX 431.
WIT DSM user interface instructions, Aug. 6, 1998, DX 427, CM 006591-CM 006632, DTX 427.
English Translation of Tokyo Stock Exchange, Orientation Materials for Participants, New Future Options Trading System, Produced on Oct. 29, 2010 by Defendant Rosenthal Collins Group, LLC (RCG) in civil proceeding 1:10-cv-00929 Trading Technologies International, Inc. v. RCG, alleged available as of Sep. 1997, RCG-TT0146811-0146830.
Japanese Document, TSE00609-627, alleged available as of Sep. 1, 1997, with English Translation cited separately (RCG-TT0146811-0146830).
English Translation of Tokyo Stock Exchange, Orientation Materials for Participants, New Future Options Trading System, Produced on Feb. 5, 2007 by Defendant GL Consultants, Inc. (GL) in civil proceeding 1:05-cv-04120 *Trading Technologies International, Inc.* v. *GL* et al, alleged available as of Sep. 1997, G0100319-0100355.
Geotext English Translation of Tokyo Stock Exchange, Futures/Options Trading System, Guidelines for Operating the Trading Terminals, alleged available as of Aug. 1, 1998, RCG-TT 0146831-RCG-TT 0146846.
Midas-Kapiti International, Market Trader, Nikkei 225 & Nikkei 300 Index Options and Index Futures Trading Users Guide, Mar. 20, 1998, DX 618, G100444-G1 00462, DTX 618.
Rosenthal Collins Group LLC, Initial Contentions for Non-Infringement and Patent Invalidity, Civil Action No. 10-cv-929, dated Oct. 29, 2010.
Swiss Exchange SWX, TS User Manual, Version 2.1, alleged available as of Dec. 31, 1998, G0107838-G0108086.
TSE Manual (Japanese-language document), System for Buying and Selling Futures and Options Transaction Terminal Operational Guidelines, alleged available as of Aug. 1, 1998, TSE0000000647-TSE0000000995.

\* cited by examiner

REPOSITIONING OF MARKET INFORMATION ON TRADING SCREENS

RELATED APPLICATIONS

This application is a continuation of U.S. patent application Ser. No. 13/044,117, now U.S. Pat. No. 8,275,696, which was filed on Mar. 9, 2011, which is a continuation of U.S. patent application Ser. No. 12/566,117, now U.S. Pat. No. 7,930,240, which was filed on Sep. 24, 2009, which is a continuation of U.S. patent application Ser. No. 11/415,407, now U.S. Pat. No. 7,613,651, which was filed on May 1, 2006, which is a continuation of U.S. patent application Ser. No. 10/609,965, now U.S. Pat. No. 7,587,357, which was filed on Jun. 30, 2003, the contents of which are fully incorporated herein by reference.

FIELD OF INVENTION

The present invention is directed towards electronic trading, and more specifically, is directed to repositioning market information for display on a trading screen and is directed to trading in such a display.

BACKGROUND

Typically, an electronic exchange provides an automatic matching process between traders, or more specifically, between buyers and sellers. Traders are connected to an electronic exchange by way of a communication link to facilitate electronic messaging between themselves and the exchange. Market information, which is included in the messaging, is received and displayed to the traders on their trading screens. Upon viewing the market information, traders can take certain actions including the action of sending buy or sell orders to the exchange.

In general, when a buy order or a sell order is sent to an electronic exchange, the exchange's computer logic checks the conditions associated with the order, for example price and quantity, and determines if a match exists. If a match does not exist, the exchange's computer logic prioritizes the order with other orders of the same price in the exchange's electronic order book. When the order conditions are satisfied in the market, or equivalently, a match exists, a trade occurs.

In many instances, spotting an opportunity in the market and capitalizing on it before the competition often separates those traders who are successful from those traders who are not. An important component in capitalizing on an opportunity involves the efficient assimilation of market information. Most conventional trading applications receive electronic messaging and attempt to display the market information in some particular fashion to the trader. Until recently, however, market information was simply displayed on a trading screen in a manner similar to how it was received from the exchange without much customization or formatting. Now developers are beginning to create sophisticated trading screens to interface electronic exchanges. Depending on the actual layout, however, some trading screens are more successful than others in displaying market information to the traders.

To be a successful trader in electronic markets, one must be able to assimilate large amounts of market information and react accordingly more quickly than other competing market participants. It is therefore desirable to improve the way market information is displayed to the trader and to improve the efficiency of order entry by using such displays.

DETAILED DESCRIPTION

Figure 1:
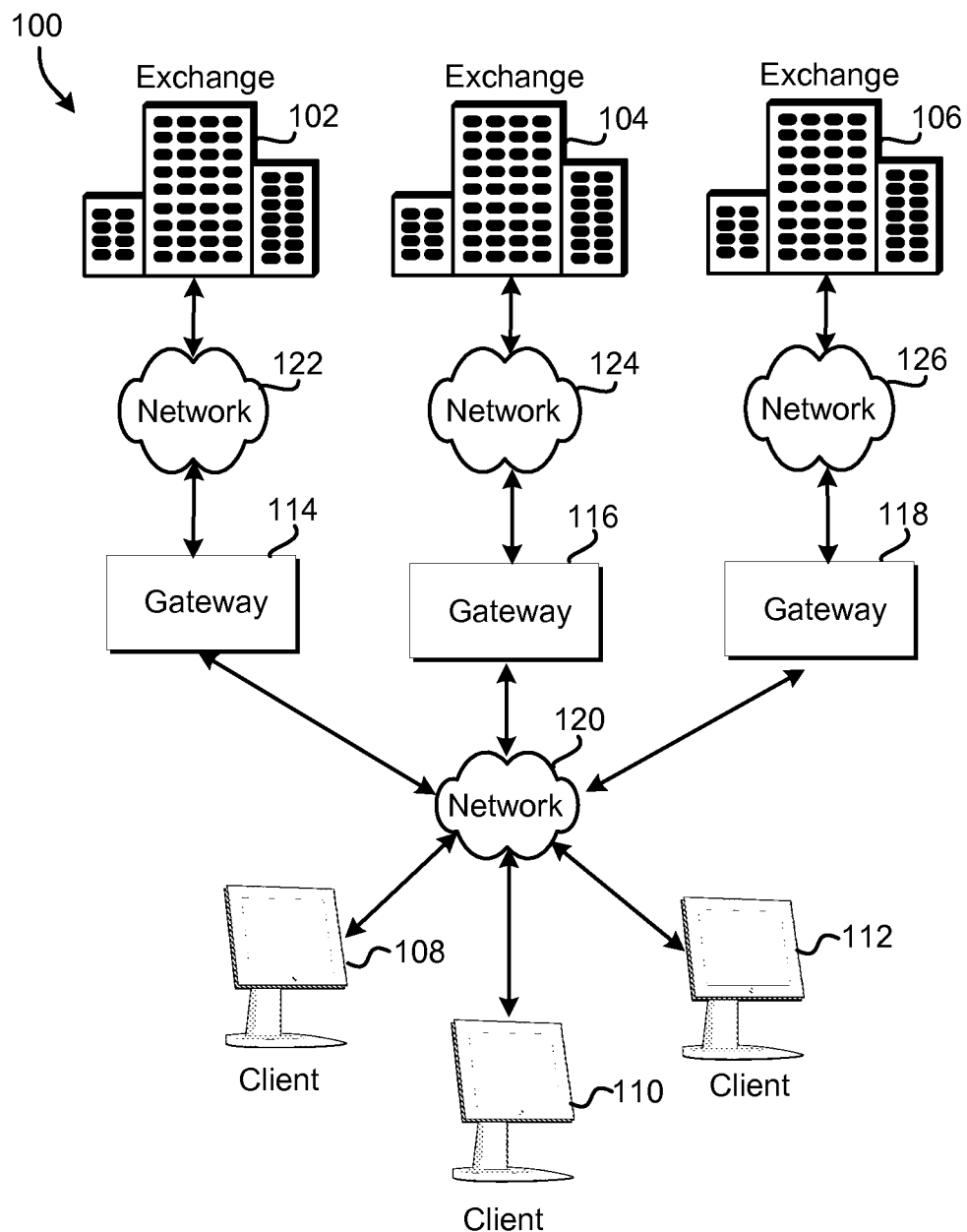
FIG. 1 is a block diagram that illustrates an electronic trading system showing an example network connection between client devices and electronic exchanges.

The present embodiments build on the price axis and re-centering concepts described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display Of Market Depth And Price Consolidation," filed on Oct. 5, 2001, U.S. patent application Ser. No. 10/125,894, entitled "Trading Tools for Electronic Trading," filed on Apr. 19, 2002, and in U.S. patent application Ser. No. 10/376,417, entitled "A System and Method for Trading and Displaying Market Information in an Electronic Trading Environment," filed on Feb. 28, 2003, the contents of each are incorporated by reference herein.

I. Overview

The way in which market information is displayed to the trader is vital to the success of trading electronically. If the information displayed is confusing or does not provide traders with what they need, their performance can degrade. Therefore, a trading interface is provided that takes advantage of a computer's graphics capabilities to make the display of market information easier to visualize and analyze. As a result, traders can make better visual judgments to detect market trends.

In particular, a trader may be interested in a specific item of interest. An item of interest may include the best bid price, the best ask price, the inside market, a moving average, a last traded price, a theoretical value, the result of an equation, or some other item of interest to the trader. Then, market information may be displayed in a region relative to an axis of prices, and upon receiving a repositioning signal, the axis is repositioned such that the selected item of interest is centered in the region. Repositioning the price axis also causes the market information to move concurrently.

The repositioning signal may be initialized by an event. An event may include any change in value of the item of interest. For example, a trader might select as an item of interest a 10-day moving average of the last traded price. When the 10-day moving average changes from one value to another, the signal is initialized causing the price axis to be repositioned. Alternatively, an event may include any changes in value of the item of interest where the magnitude of the change falls outside of a particular tolerance level, which is defined by one or more limits. Using the 10-day moving average example to illustrate this alternative embodiment, assume that the 10-day moving average has to change by "5" price units before the signal is initialized causing the price axis to be repositioned. Of course, any number of limits may be set to obtain the appropriate tolerance level(s).

In addition, the price axis may be repositioned at a particular rate. The rate is the speed at which the price axis is shifted such that the display screen goes from displaying one view of the price axis to another view. It is envisioned that the repositioning may occur at any rate. For example, at one end of the spectrum, the rate may be instant (or near instant), and at the other end of the spectrum, the rate may be gradual such that the price axis and indicators smoothly glide from one view to another, so as not to distract the trader and to avoid errors in order entry, if order entry is provided. One or more rates may be chosen by the trader or hard-coded, which might depend on the options given by the applications software. Also, a rate may be dynamically variable or fixed.

The price axis may be repositioned such that the selected item of interest is centered in a region. Of course, depending on the granularity of the displayed price scale and the item of interest, the item of interest may not always lie directly in the center of the region. Additionally, it also envisioned that the price axis may be repositioned in a smooth and continuous fashion so that the item of interest can be directly centered or directly positioned at the desired destination location. This is particularly useful when the item of interest is associated with a price level that can fall between two marked price levels. Also, if programmed to do so, the item of interest may be positioned in a location different from the center of the region. Because the price axis can be repositioned along the price axis in a smooth and continuous fashion, the item of interest can be positioned in an infinite number of locations along the price axis.

One skilled in the art of trading would appreciate the benefits of the present embodiments and could recognize its advantages from the teachings described herein. Some advantages include the efficient market information assimilation by the trader and minimal memory load on the trader. In addition, the present embodiments relieve the need to read and interpret strictly alphanumeric data by displaying market information graphically along a price axis while placing particular emphasis on the item of interest. Yet another advantage is that the repositioning rate may be set to a slow enough speed so as not to distract the trader when a repositioning occurs. A slow repositioning rate may augment the assimilation of market information by enhancing the movement of the market according to some item of interest. Moreover, the price axis may be repositioned in a continuous manner such that the price axis and indicators smoothly glide from the one view to another view. In addition to displaying market information, the format of the display may be directly linked to data entry including order entry. These advantages and more become readily apparent from reading the description below.

The present embodiments now will be described more fully hereinafter with reference to the accompanying Figures. The present embodiments may be embodied in many different forms and should not be construed as limited to the embodiments set forth herein.

II. Preferred System Architecture

FIG. 1 is a block diagram that illustrates an electronic trading system 100 in accordance with the present embodiments. The system 100 includes one or more exchanges 102, 104, 106 and one or more client devices 108, 110, 112. Intermediate devices such as gateways 114, 116, 118, routers (not shown in the Figure for sake of clarity), and other such types of network devices may be used to connect network 120 to networks 122, 124, 126 so that client devices 108, 110, 112 and exchanges 102, 104, 106 can communicate market information. It should be understood that the present embodiments are not limited to any particular system configuration. For example, networks 122, 124, and 126 could represent the same network, network 120 could represent the same network as networks 122, 124, and 126, or client devices 108, 110, 112 could connect separately to gateways 114, 116, 118. Of course, the present embodiments may be implemented on many other system configurations.

A. Exchange

Exchanges 102, 104, 106 may represent any exchange that participates in electronic trading. The London International Financial Futures and Options Exchange (LIFFE), the Chicago Board of Trade (CBOT), the New York Stock Exchange (NYSE), the Chicago Mercantile Exchange (CME), the Exchange Electronic Trading ("Xetra," a German stock exchange), and the European Exchange ("Eurex") are examples of exchanges that participate in electronic trading. Exchanges 102, 104, 106 might also refer to other facilities, which include basic to complex systems that automatically match incoming orders. These example exchanges and other exchanges are well known in the art. Communication protocols required for connectivity to one of these exchanges are also well known in the art.

Exchanges 102, 104, 106 allow traders to log onto a market to trade tradable objects. As used herein, the term "tradable objects," refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable object, such as a class of tradable objects.

An exchange 102, 104, 106 can implement numerous types of order execution algorithms, sometimes the type of algorithm depends on the tradable object being traded. Preferably, the preferred embodiments can be adapted by one skilled in the art to work with any particular order execution algorithm. Some example order execution algorithms include first-in-first-out and pro rata algorithms. The first-in-first-out (FIFO) algorithm, used for some markets listed with Eurex for example, gives priority to the first person to place an order. The pro rata algorithm, used for some markets listed with LIFFE for example, splits all orders for the same price. The present invention is not limited to any particular type of order execution algorithm.

Regardless of the type of order execution algorithm used, each exchange 102, 104, 106 preferably provides similar types of information to subscribing client devices 108, 110, 112. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, exchanges 102, 104, 106 can offer other types of market information such as the last traded price (LTP), the last traded quantity (LTQ), and order fill information.

B. Gateway

Gateways 114, 116, 118 are devices such as a mainframe, super minicomputer, minicomputer, workstation, or microcomputer that connect network 120 to networks 122, 124, 126 so that market information can be successfully passed between client devices 108, 110, 112 and exchanges 102, 104, 106. Gateways 114, 116, 118 receive market information from exchanges 102, 104, 106 and convert it to a form compatible with the protocols used by client devices 108, 110, 112 using conversion techniques known in the art. Also, as known by those skilled in the art, gateways 114, 116, 118 may have one or more servers to support the data feeds, such as a price server for processing price information, an order server for processing order information, and a fill server for processing fill information. A trader at one of client devices 108, 110, 112 can subscribe to price information, order information, and fill information for a particular market hosted at exchanges 102, 104, 106. Gateways 114, 116, 118 also receive transaction information, such as orders, order changes, queries, etc. from client devices 108, 110, 112 and forward that information to corresponding exchanges 102, 104, 106.

C. Client Device

Client devices 108, 110, 112 are devices that provide an interface for traders to trade at one or more markets listed with one, some, or all of exchanges 102, 104, 106. Some examples of client devices include a personal computer, laptop computer, hand-held computer, and so forth. Client devices 108, 110, 112, according to the preferred embodiments, include at least a processor and memory. The processor and memory, which are both well-known computer components, are not shown in the Figure for sake of clarity. Preferably, the processor has enough processing power to handle and process the various types of market information. Of course, the more market information that is received and processed, the more processing power is preferred. However, any present day processor has enough capability to perform at least the most basic part of the present invention.

Memory may include computer readable medium. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

Client devices 108, 110, 112 receive market information from any of exchanges 102, 104, 106. Market information is displayed to the trader(s) on the visual output device or display device. Upon viewing the market information or a portion thereof, a trader may wish to send orders to an exchange, cancel orders in a market, change orders in a market, query an exchange, and so on. To do so, the trader may input various commands or signals into the client device 104, for example, by using one or more conventional means for inputting information such as typing into a keyboard, inputting commands through a mouse, or inputting commands or signals through some other well-known multi-purpose input device.

Upon receiving one or more commands or signals, client devices 108, 110, 112 preferably generate transaction information. For instance, a trader may press a key or button to initiate an order to buy a tradable object. Then, transaction information would include an order to buy a particular quantity of the tradable object at a particular price. There are many different types of messages and/or order types that can be submitted to an electronic exchange, all of which may be considered various types of transaction information. Once generated, transaction information is sent from client device 104 to host exchange 102 over network(s) 120, 122, 124, 126.

Figure 2:
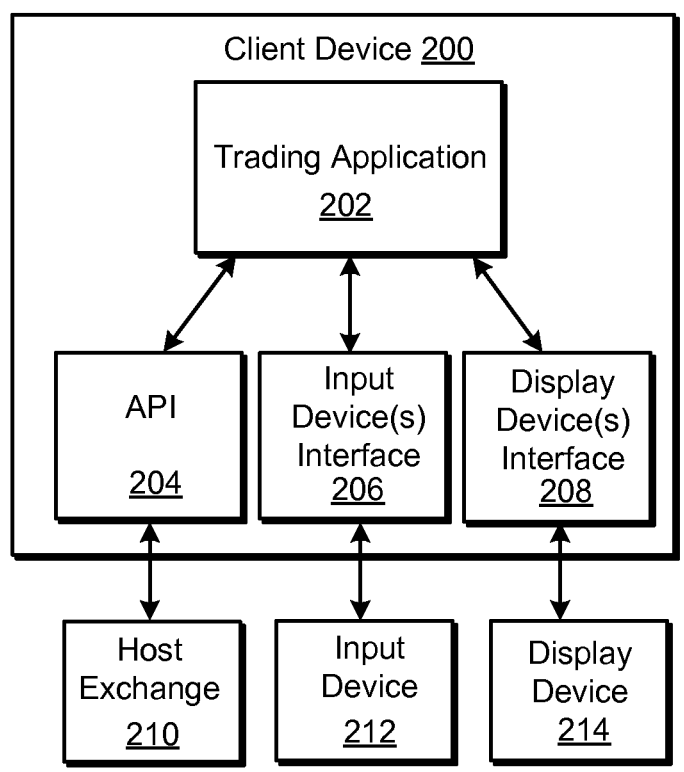
FIG. 2 is a block diagram that illustrates a software/hardware overview of an example client device for use in a system such as shown in FIG. 1.

FIG. 2 shows an overview of client device 200 which may be similar to the type of client devices 108, 110, 112 shown in FIG. 1. Client device 200 can be any particular type of computing device, examples of which were enumerated above with respect to the client devices. According to the preferred embodiments, client device 200 has trading application 202 stored in memory that when executed it may arrange and display market information in many particular ways, usually depending on how the trader prefers to view the information. Preferably, trading application 202 has access to market information through API 204 (or application programming interface) and trading application 202 can forward transaction information to exchange 210 via API 204. Alternatively, API 204 could be distributed so that a portion of the API rests on the client device 200 and a gateway, or at the exchange 210.

III. Event Driven Repositioning of a Price Axis

Figure 3:
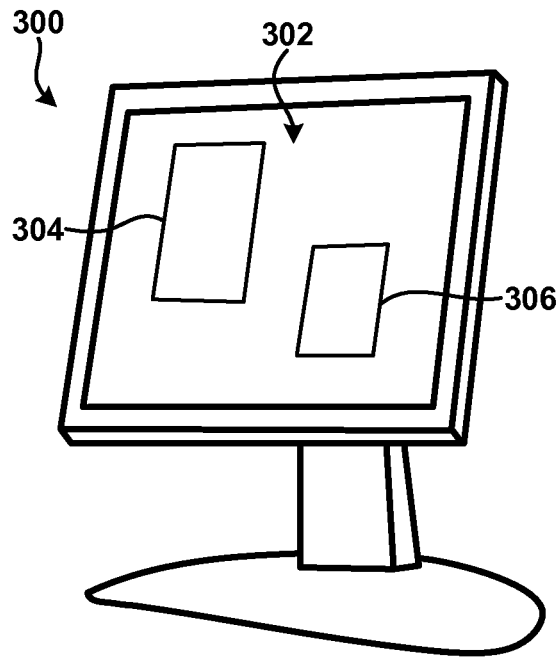
FIG. 3 is a diagram of a flat-panel display and its screen to illustrate how a trading interface of the present embodiments may be viewed in a window by a trader.

FIG. 3 shows an example monitor 300 and display screen 302 for use with the present embodiments. In the Figure, monitor 300 resembles an LCD-based or a gas plasma-based flat-panel often used with desktop computers or docking stations for laptop computers. However, any monitor or display device (e.g., display device represented by block 214 in FIG. 2) on which images may be generated can be used. Therefore, it should be understood that the present embodiments are not limited to any particular type of display device, but for sake of illustration some example display devices include a cathode ray tube (CRT), a projector or use of multiple projectors to create a tiled display with overlapping projection, a display made up of light emitting diodes (LEDs), or they include some other type of known technology. Monitor 300 and display screen 302 may range in size from very small to accommodate a small hand-held device to very large to accommodate a large public display.

Display screen 302 is the visual output of monitor 300. In general, display screen 302 remains static while other elements on the screen 302 can change. For example, window borders 304, 306 on the display screen 302 can change depending on the user's preferences. Window borders 304, 306 surround portions of the display screen 302 that can contain its own document or message and may be re-sized or moved around the display screen 302. According to some operating systems like Microsoft Windows® and its variations, the display screen 302 can be divided into more than one window, each of which has its own boundaries and can contain different market information (or another view into the same market). For sake of illustration, two windows formed by window borders 304, 306 are shown in display screen 302, although any number of windows may be displayed. In addition, the trading windows defined by borders 304, 306 may be made smaller or larger and dragged across display screen 302 to suit the needs of the trader.

Market information may be displayed in a window relative to an axis of prices. For example, market information can be displayed in either window defined by borders 304 or 306, relative to an axis of prices associated with that window. More specifically, a window may have one or more regions that are aligned with a price axis. For example, a region might contain indicators that represent bid information and another region might contain indicators that represent ask information. The bid region and the ask region may be aligned with the axis of prices. Then, when changes in the market occur, the trader can visualize them by watching indicators in the regions move along the price axis. For a better understanding of the price axis and how it relates to particular regions, the reader may refer to the above-incorporated patent applications. Additionally, trading window examples, which show a price axis, are described herein with respect to FIGS. 6-12. Trading window examples shown in FIGS. 6-12 may also include order entry capabilities, however, it should be understood that the trading interface of the present embodiments could be used only for displaying market information.

Figure 4:
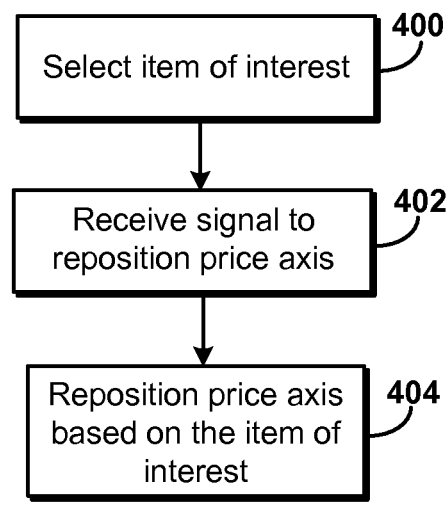
FIG. 4 is a flowchart that illustrates an example process of repositioning a price axis to center an item of interest in a display region.

FIG. 4 is a flowchart that illustrates a process for repositioning a price axis to center an item of interest in a region. The flowchart shown in FIG. 4 provides an illustrative description for repositioning a price axis, and more or fewer steps may be included in the flowchart, and/or steps may occur in one or more orders that are different from the order of steps shown in the Figure. Some example variations are included in the description of the various blocks shown in the Figure.

At block 400, a trader can preferably select an item of interest. An item of interest may include the best bid price, the best ask price, the inside market (both the best bid price and the best ask price), a moving average, a last traded price, a theoretical value, or any other type of indicator(s) that a trader may find of particular interest. An item of interest may be a value that is received from an exchange through its electronic messaging. For instance, some exchanges provide, among other things, the inside market in its electronic messaging or price feed. It is also possible that the item of interest has a value that is equal to the result of an expression of an equation or algorithm, where the result can be equal to the expression in the equation, greater than the expression in the equation, or less than the expression in the equation, depending on the operator used. For example, a 5-hour moving average of the inside market is an example of a solution to an equation where the algorithm averages the inside market over the previous five hours. If there is more than one item of interest, then it might be desirable to allow a trader to select one item of interest from a list of options.

If tracking more than one item of interest is preferred, then the present embodiments may be programmed to allow for selection of more than one item of interest at any given time. For example, a trader might be interested in the inside market and a 1-month moving average of the inside market. Then, the present embodiments can reposition the price axis based on the inside market and the 1-month moving average of the inside market.

At block 402, an event occurs which triggers the repositioning signal to reposition the price axis. An event may include any change in value of the item of interest(s). An example was given earlier with respect to a 10-day moving average. As soon as the 10-day moving average changed from one value to the next, the signal was initialized and the price axis was repositioned. The 10-day moving average is an example of an item of interest being generated by an equation. For another example of an event, assume that a trader selected the last traded price as the item of interest and it was last viewed at "105." Shortly thereafter, the last traded price changed to "107." The change from "105" to "107" may be a programmed event that triggers the repositioning signal to cause a repositioning of the price axis. This last example showed a change from a whole number to another whole number; however, an event might also include an instance where the item of interest changed in only fractional increments. According to the preceding example, the value of the item of interest changing from "105" to "105.1" is one illustration. This is also assuming that the software tracks (or the exchange provides) the last traded price in "0.1" increments. In addition, an event may be caused by a change equal to the smallest increment of change possible by the item of interest.

Figure 5:
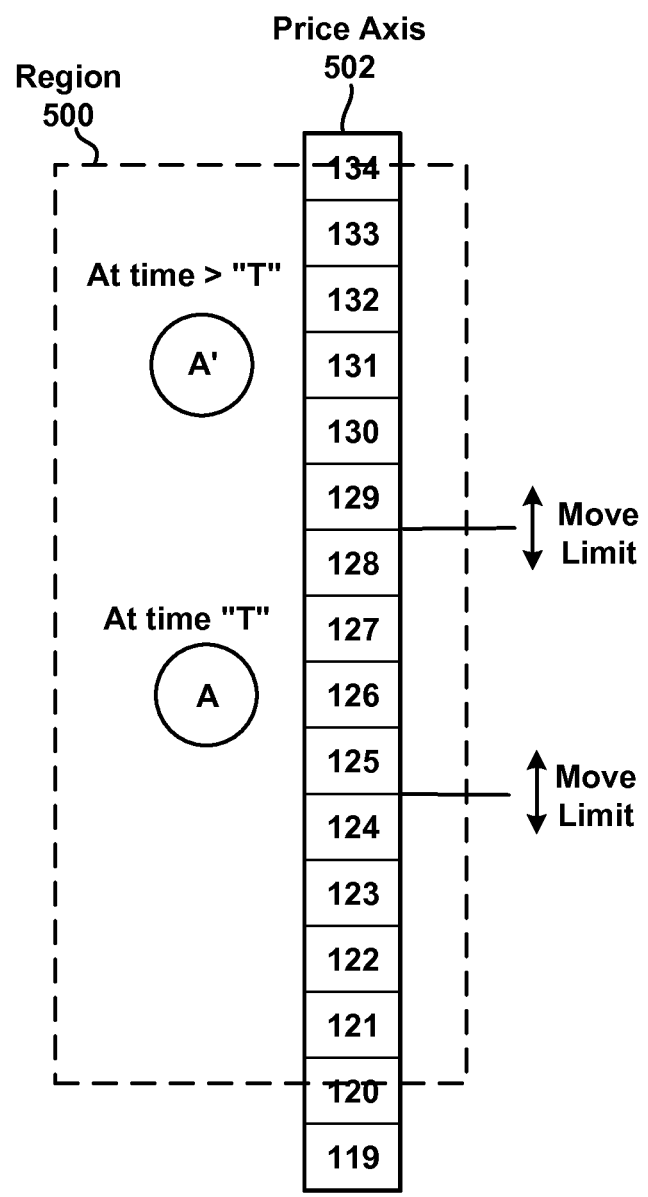
FIG. 5 shows a price axis with example prices and a generic item of interest to illustrate the use of limits.

There might be instances when a trader does not want the price axis to be repositioned every time a change to the item of interest occurs. Therefore, it might be advantageous to provide additional inputs that can be used to determine when the price axis is to be repositioned. FIG. 5 shows an example to illustrate the possibilities of additional inputs and how they may be applied in accordance with the present embodiments.

In general, FIG. 5 shows region 500 with price axis 502 having prices from "119" to "134" in one-tick increments and a generic item of interest referred to as "A." FIG. 5 also shows a limit set at "125" and a limit set at "128." The limit(s) may be chosen by the trader or hard coded in the software whichever is preferred. If the limit is chosen by the trader, an entry field may be provided to enter in the limits. Alternatively, a slider bar could be provided. Then, for each limit a slider bar may be dragged up or down along the price axis to indicate the number of units of movement that are acceptable by the item of interest before the price axis is repositioned. According to the example shown in FIG. 5, the limits may be set to provide more tolerance in movement by the item of interest. When the item of interest "A" moves outside/beyond one of those limits, the price axis is repositioned. Additionally, the limits may be set so that the price axis is repositioned every time the item of interest moves or changes.

It should also be understood that any number of limits might be applied to accommodate various levels of reposition rates. For example, a limit could be placed at "128," "131" and "off-screen" such that when the value of the item of interest falls between "128" and "131" the price axis is repositioned at one-rate, when the value falls between "131" and "off-screen" the price axis is repositioned at a second-rate, and when the value is greater than "off-screen" the price axis is reposition at a third-rate. The number of combinations of limits and rates that can be set according to the present embodiments are virtually endless.

If more than one item of interest was selected, then an event occurs when one of the items of interest changes in value or when one of the items of interest moves outside of a boundary, whichever mode is used. Also, it might be possible that each item of interest uses a different mode. For example, an event might occur when the value of one item of interest changes and another event might occur when the value of a second item of interest moves outside of a boundary. If the value of both items of interest changes or moves simultaneously, then each change or movement may be programmed to cause an event. Alternatively, when the value to both items of interest changes or moves simultaneously, only the larger change or movement causes an event. Of course, these concepts may be equally applied to situations when more than two items of interest are selected.

It should also be understood that the repositioning signal might be triggered by a trader wishing to manually repositioning the price axis by selecting a repositioning button or icon. If this option is provided, it is preferable that the process of manually repositioning the price axis can occur at any time the repositioning button or icon is selected.

At block 404, the price axis is repositioned in response to the signal. The signal can simply be the occurrence of an event. For instance, flag bits may be used to signal when the price axis is repositioned. The price axis is preferably repositioned such that the item of interest is centered in a region, or if desired, the price axis is repositioned such that the item of interest is positioned at another location that is different from the center. If the location is different from the center, the trader could select the location that the item of interest should be positioned. Note that it is also possible for a second event to occur while the price axis is being repositioned in response to the first event. In such circumstances, it is preferred that the price axis is repositioned according to the second event. Therefore, repositioning the price axis to a destination position based on the most recent event is preferred as it takes into account the most recent value of the item of interest.

Referring again to FIG. 5, the concepts set forth in blocks 402 and 404 are illustrated. In this instance, assume that at some time greater than time "T" the item of interest A jumped to A', which is at a price level of "131." However, price level "131" is outside of the upper limit, or in this example, "128." As a result, the price axis would be repositioned so that the A' is positioned back into the center of the region 500 (or some other designated reference point if not in the center of the region).

So far, when a designated event occurs, a repositioning signal is initiated and the price axis is repositioned. In addition, the price axis may be repositioned at a designated rate. Previously stated, the rate is the speed at which the price axis is shifted such that the window goes from showing one view of the price axis to another view. The rate can include a range of speeds from instantaneously repositioning the price axis to very slowly repositioning the price axis. The rate may be defined as the number of pixels per time unit or by some measurement of speed. Although not shown in FIG. 4, the step of selecting a rate (or rates, if more than one rate is used) may be added to the process.

According to the present embodiments, the rate can be variable or fixed. If the rate is variable, then as the price axis is repositioned, the speed at which the repositioning occurs may dynamically change. For example, the rate of repositioning might be fast and as the item of interest moves closer to the destination position, the rate might decrease. The variable rate might be set up by a trader or through some specific algorithm (e.g., if the value is "off-screen" then the price axis is moved at 200 pixels per second otherwise the price axis is moved at 50 pixels per second). If the rate is fixed, then as the price axis is repositioned, the speed at which the repositioning occurs will not change regardless of whether the change in value was large or small.

According to another embodiment, the rate is determined based on a certain parameter or parameters. For example, parameters might include a minimum rate while the item of interest is on-screen, a minimum rate while the item of interest is off-screen, a maximum rate while item of interest is on-screen, a maximum rate while item of interest is off-screen, or the distance from the current position to the destination, with a smooth rate destination. To illustrate, if the item of interest has moved off-screen, then the rate might be faster than if the item of interest had moved a little off-center. The present embodiments are preferably flexible enough to allow the trader to set up various limits and rates (variable/fixed) that correspond to those limits.

The reposition rate may also be adjustable based on other parameters such as maximum acceleration of the rate. This parameter can be employed when the display is being positioned and another signaling event occurs while the positioning is still occurring, or if the other factors in a variable rate of repositioning have changed. Either situation would have an old rate and a newly calculated rate, perhaps even in the opposite direction. The maximum acceleration of the rate may be used to smoothly transition between the two rates.

Other enhancements may be used to provide the trader with increased flexibility in market views. For example, the reposition may be accompanied by a zoom in/zoom out of the market, or similarly, a change of price scale. Zooming in and zooming out may be useful during periods of rapid market movement. In addition, this self scaling feature could aid the viewer by zooming out on the price axis to prevent the market from "running off the screen," and as the item of interest is moved closer to its destination position the display could zoom back in to either the previous zoom level or a preset zoom level of the price axis.

In addition to zooming out and zooming in, the present embodiments might link the display to a second display of the same market. The display of the second market could use a larger scale with graphical means depicting the space occupied by the primary display. In particular, the second display could show an overview of the market, while the primary display could show a more detailed look at the market information near the item of interest, or vice versa.

Sometimes a trader might have an interest in more than one market. For instance, the trader might have an interest in trading spreads. A spread has two or more underlying tradable objects. To view the activity of each underlying tradable object market, the trader might have a trading window open on a screen for each of them. Each window may have a separate price axis against which market information is displayed. According to the present embodiments, the price axis of each window may be repositioned when a specified event occurs. For example, an event might occur in one market that causes the price axes of all other associated windows to reposition. To illustrate, assume that a trader is trading a two-legged spread. The trader has three windows displayed on the screen; one window for the spread market, a second window for the buy leg and a third window for the sell leg. Assume also that a 1-hour moving average of the spread inside market is the item of interest. When the 1-hour moving average changes, the price axis in the first window is repositioned. Moreover, the price axes of the second and third windows are also repositioned to display relevant market views. Spread trading is described in U.S. patent application Ser. No. 10/137,979, entitled "System and Method for Performing Automatic Spread Trading," filed on May 3, 2002. Of course, the present embodiments are not limited to spread trading, but can be used anytime when markets are preferably grouped together.

Some additional examples are now provided to illustrate some concepts of the present embodiments.

A. Example 1

Figure 6:
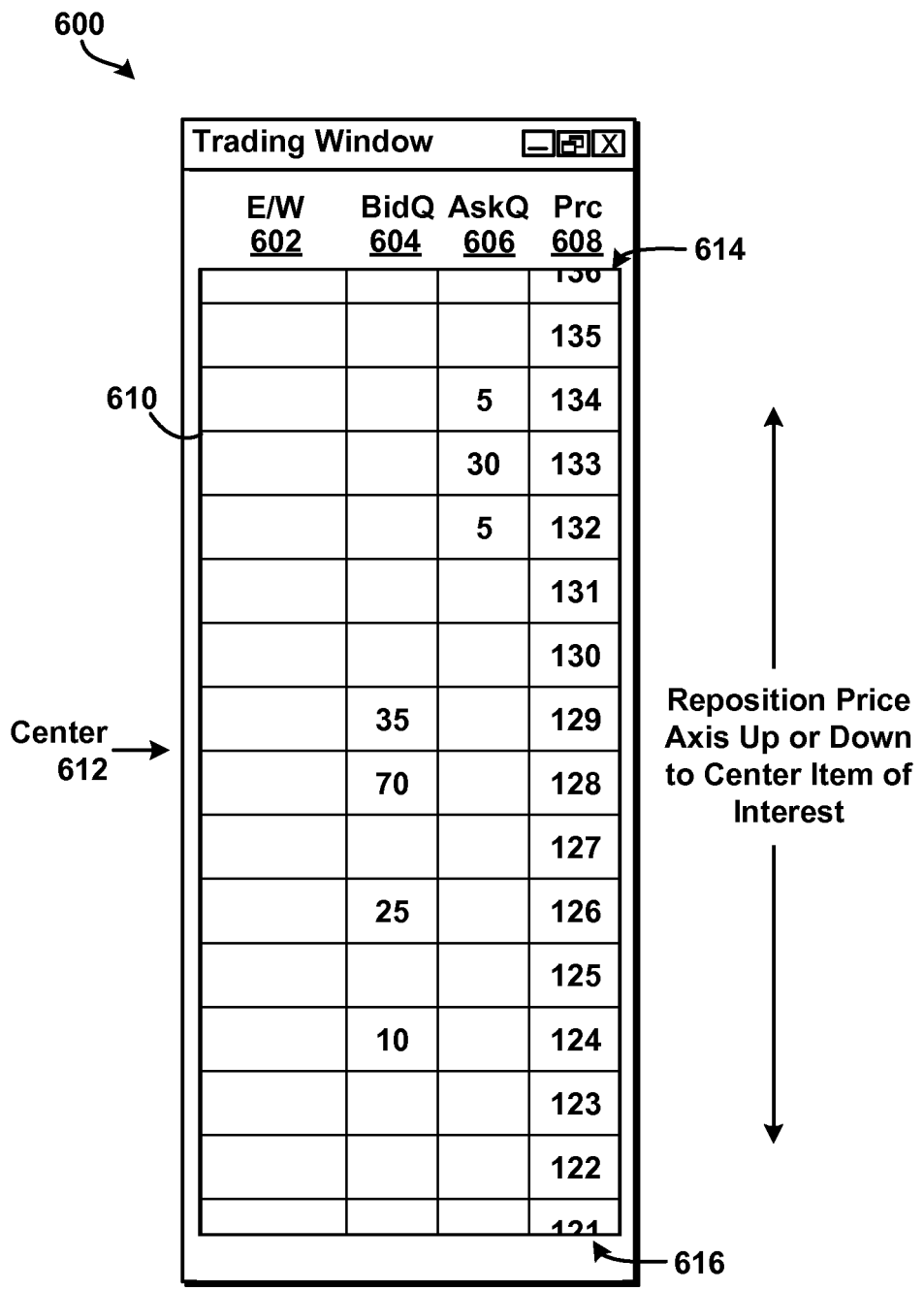
FIG. 6 shows an example trading interface with a price axis such that the price axis may be moved in a smooth and continuous fashion to position items of interest.

FIG. 6 shows a trading interface 600 for displaying market information along a price axis 608 in region 610. Price axis 608 and variations of price axis 608 are described in the above incorporated U.S. patent application Ser. No. 09/590,692, entitled "Click Based Trading With Intuitive Grid Display of Market Depth," and in U.S. patent application Ser. No. 10/376,417, entitled "A System and Method for Trading and Displaying Market Information in an Electronic Trading Environment."

As a brief overview, price values situated along the price axis 608 are statically displayed. That is, the price levels do not normally change positions unless a re-centering, repositioning or other user initiated command is received. The indicators displayed in other regions, such as bid quantity display region 604 and ask quantity display region 606, are dynamic. For example, they move up and down along the price axis 608 to reflect the inside market and/or market depth for the given tradable object. So, for example, when the inside market moves up in price, quantities populate the appropriate price levels which using the preferred display shows that the inside market has just moved up. Similarly, when the inside market moves down in price such that quantities populate the appropriate price levels which shows that the inside market has just moved down. Additionally, quantity values displayed in the bid and ask regions 604, 606 are dynamic in the sense that the actual quantity itself may go up or down in magnitude at a particular price level. Regardless of whether the price axis is straight or curved, horizontal or vertical (or oriented any other angle), the display and trading methods of the present embodiments preferably allow the trader to better visualize movement in the market more quickly.

According to FIG. 6, the movement of the price axis is smooth and continuous. That is, the price axis can be variably positioned in any location to center the item of interest in a region and not have to "snap" from one marked price level to another marked price level. To illustrate, assume for the moment that the item of interest is the last traded price that is currently at "128.5," which is not a marked price level. As a result, the price axis 608 is positioned such that the last traded price is directly in the center 612. Notice that only partial views of the price "136" at 614 and price "121" at 616 are shown. This is because the trading interface according to this embodiment allows smooth and continuous movement of the price axis, and therefore, a partial display of price levels along price axis 608 may result.

In addition, it should be understood that the actual prices do not necessarily have to be displayed. According to this embodiment, it is possible to center the market information on the last traded price without the need for displaying the price levels. The bid quantities and the ask quantities would remain in the same positions in their regions 604, 606.

B. Example 2

Figure 7:
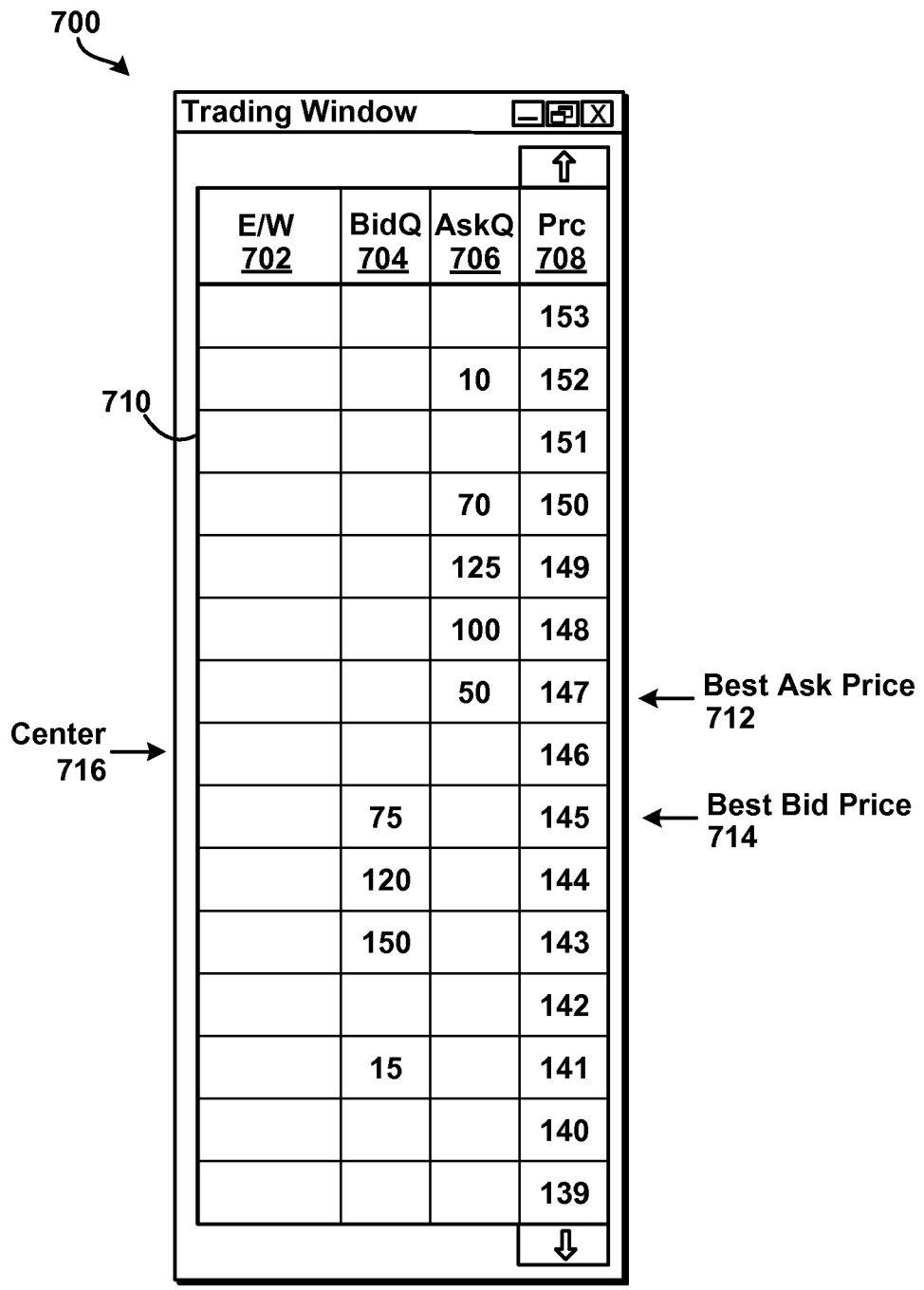
FIG. 7 shows an example trading interface with a price axis used in displaying market information wherein the inside market is currently centered in a display region.
Figure 8:
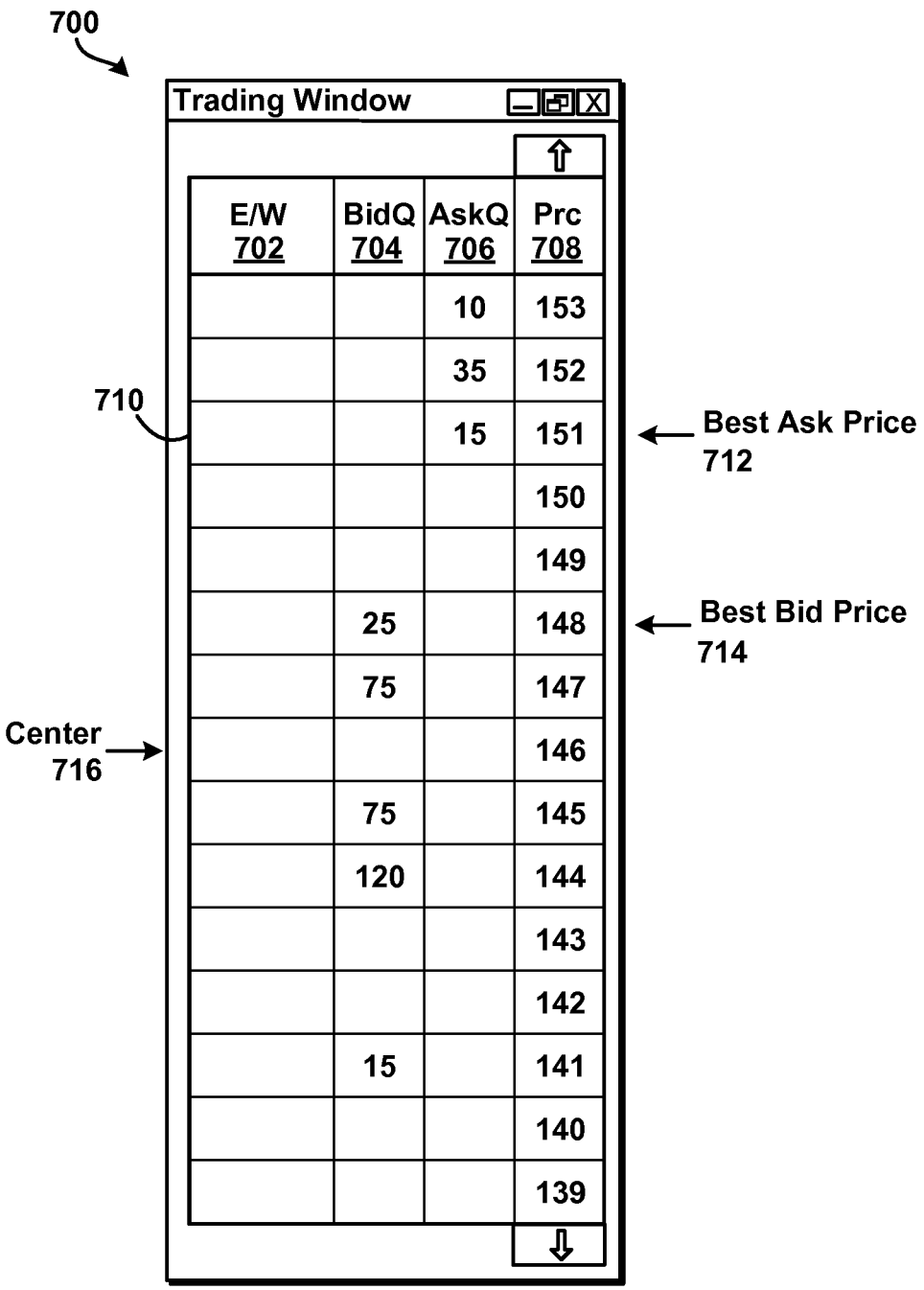
FIG. 8 shows the trading interface of FIG. 7, except that some time later the inside market has moved up in value and has moved along the price axis.
Figure 9:
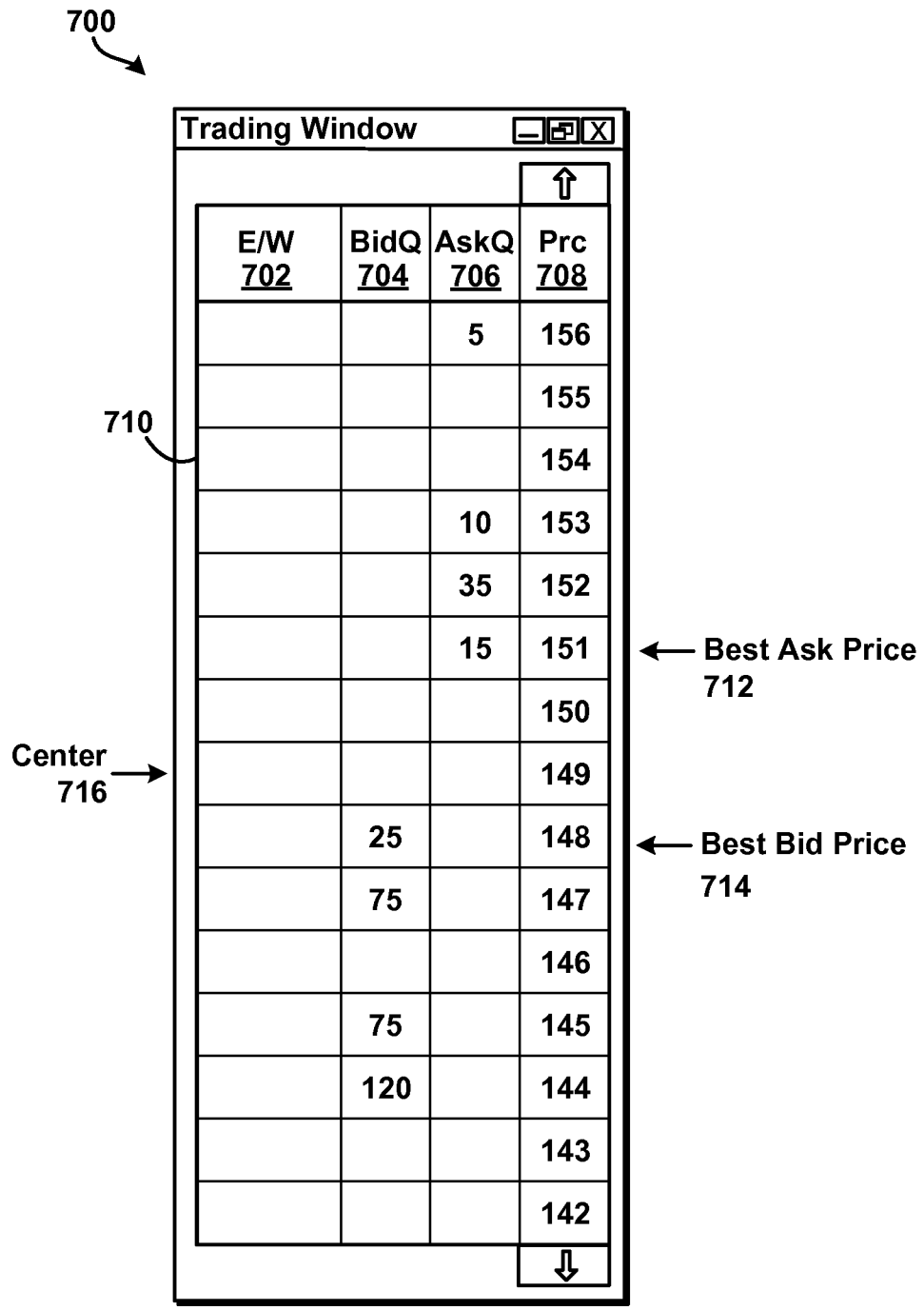
FIG. 9 shows the trading interface of FIG. 7, except that the inside market has been repositioned in the center or near the center of the display region.

This example illustrates when the event consists of the inside market moving outside a set limit. FIGS. 7-9 show a trading interface 700 for displaying market information along a price axis 708 in region 710. Of course, the limit can be set to any value, but for sake of illustration this example assumes a limit set at three ticks away from the top (or at the top $\frac{1}{5}^{th}$ of the region if the movement of the price axis is smooth and continuous like that shown in FIG. 6) and at three ticks away from the bottom (or at the bottom $\frac{1}{5}^{th}$ of the region if the movement of the price axis is smooth and continuous like that shown in FIG. 6). For this example, when one of the inside market prices moves outside of a limit, the price axis is repositioned. Another possible way to set limits include when the average of the inside market (the average of the best ask and the best bid) moves outside of either limit.

According to FIG. 7, the inside market and the quantities available at the inside market are centered, or near centered, in the display regions 704, 706 and 708. In other words, a portion of the price axis from price "139" to price "153" is viewed such that the current inside market price "145" and price "147" are displayed in the center or near center of their respective regions. Of course, the inside market may be repositioned to a designated location rather than centering, such as offsetting the inside market above or below the center of their regions.

FIG. 8 shows the trading interface 700 of FIG. 7, except that some time later, the inside market has moved up in value along the price axis to "148" and "151." At this instant the inside market is off-center and the best ask price has just moved outside of the pre-set limit. Therefore, a signal to reposition is initialized.

FIG. 9 shows the trading interface 700 of FIG. 7 with the same market information as shown in FIG. 8, except that the inside market has been re-centered so that inside market indicators are centered in display regions 704 and 706. According to the present embodiments, once the inside market reaches a designated location or becomes out of view in the display region 710, another portion of the price axis is shown in display region 710. In particular, prices from price "142" to price "156" are displayed so that the item of interest is centered in its region(s).

In another embodiment, the reposition operation does not necessarily center the inside market, but positions the market based on a predictive model. For example, using the previous market values, the price axis might be positioned so that the inside market is "off-center" to allow for more space on one side (e.g., buy side or sell side) for the market to continue to move in the direction predicted by the model.

The display of market information may be repositioned at a pre-determined rate. According to one embodiment, the pre-determined rate may be dynamically adjustable, based on a number of parameters (e.g., minimum rate while the inside market is on-screen, minimum rate while the inside market is off-screen, maximum rate while market is on-screen, maximum rate while market is off-screen, or the distance from the current position to the destination with a smooth rate destination.). Alternatively, the pre-determined rate is equal to some fixed, hard-coded rate. Regardless of whether the pre-determined rate is adjustable or fixed, it is preferred that the rate may be set slow enough relative to the movement caused by changes in the market such that the view of the market as a whole along the axis of prices is not disturbed to the trader. Being able to set the rate of repositioning to a slow rate is especially important if the item of interest experiences large and sudden changes. Under such circumstances, the slow repositioning may actually enhance the visualization of the market trend by allowing a trader to see the movement of the price axis at it is repositioned. In addition, sometimes it might be of little significance to set a slow rate especially if the item of interest experiences small changes.

C. Example 3

This example illustrates when the event consists of a moving average. According to FIG. 10, the moving average price is centered, or near centered, in the display region 1010. More particularly, a portion of the price axis from price "120" to price "134" is viewed in display region 1010 such that the current moving average price "127" is displayed in the center or near center. The moving average may be repositioned to a designated location rather than centering, such as offsetting the inside market above or below the center of display region 1010.

Figure 10:
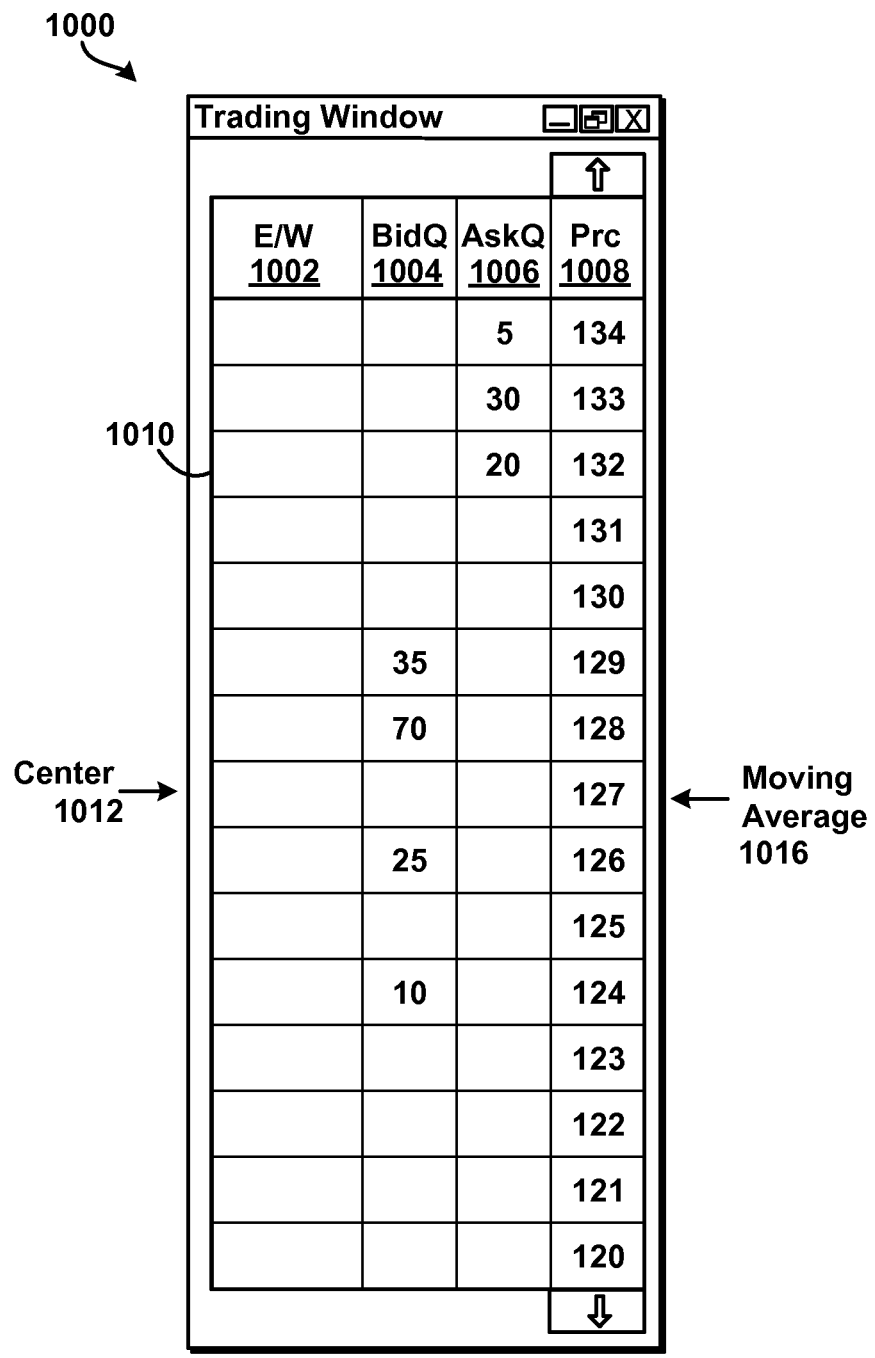
FIG. 10 shows an example trading interface with a price axis used in displaying market information wherein the moving average is currently centered in the display region.
Figure 11:
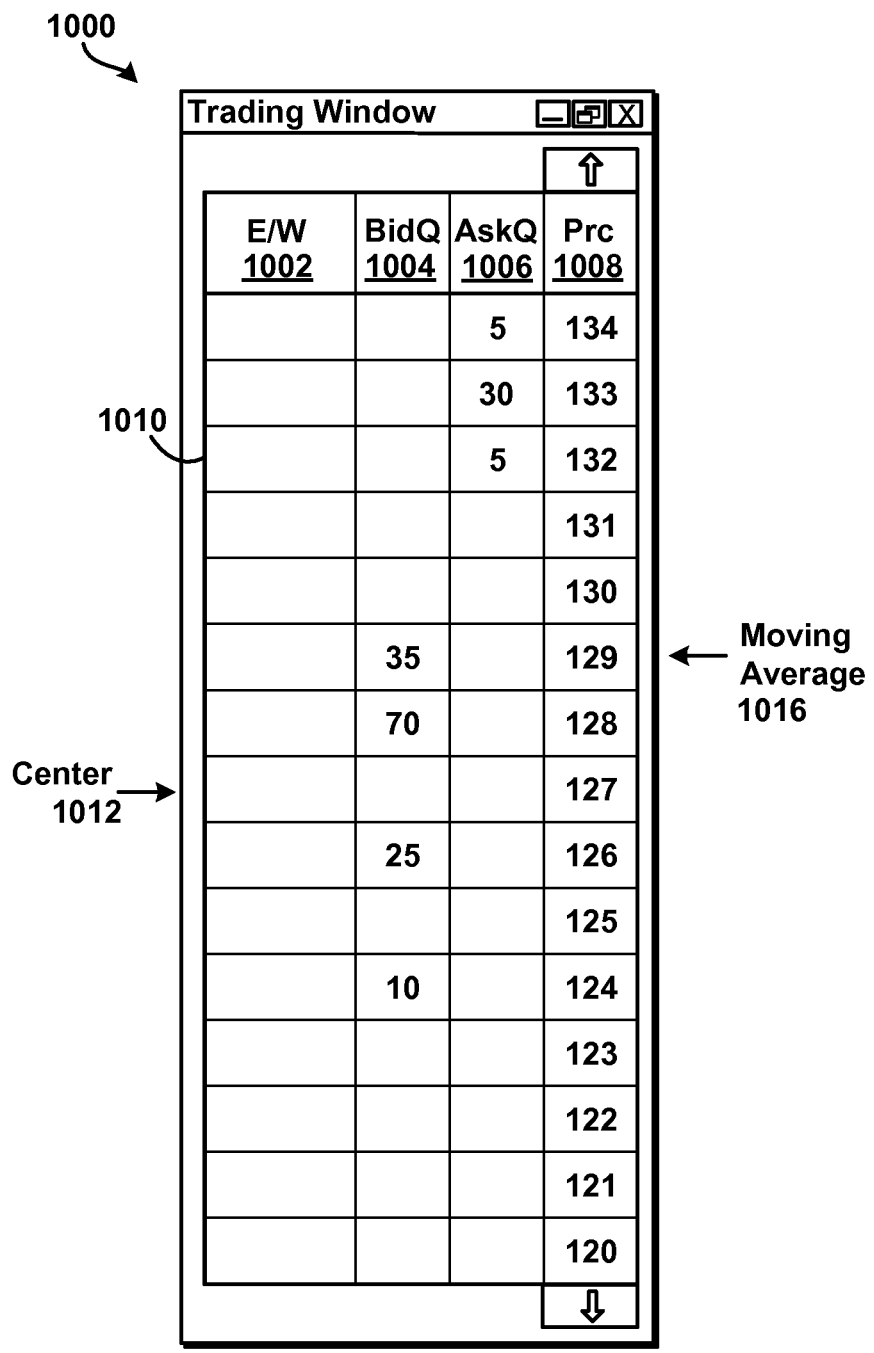
FIG. 11 shows the trading interface of FIG. 10, except that some time later the moving average has increased in value and has moved along the price axis.

FIG. 11 shows the trading interface 1000 of FIG. 10, except that some time later, the moving average has moved up in value along the price axis to "129." At this instant the inside market is off-center and has moved outside of the pre-set limit. Therefore, a signal to reposition is initialized.

Figure 12:
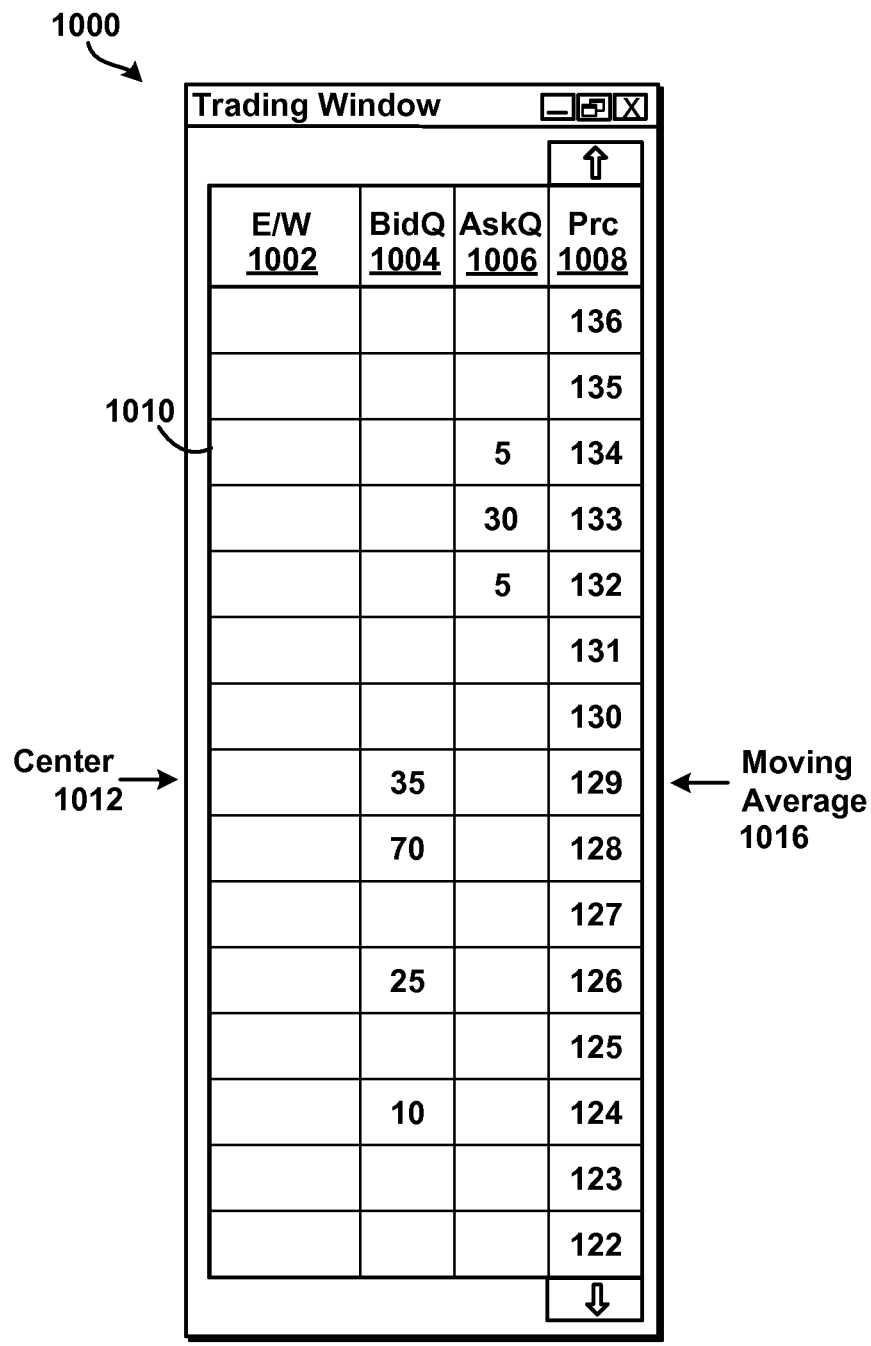
FIG. 12 shows the trading interface of FIG. 10, except that the moving average has been repositioned in the center or near the center of the display region.

FIG. 12 shows the trading interface 1000 of FIG. 10 with the same market information as shown in FIG. 11, except that the moving average has been re-centered in the display region 1010. According to the preferred embodiments, once the moving average reaches a designated location or becomes out of view in the display region 1010, another portion of the price axis is shown in display region 1010. In particular, prices from price "122" to price "136" are displayed in the center or near center.

According to the present embodiments, the repositioning rate may be set slow enough to augment the assimilation of market information by enhancing the movement in the movement according to some chose criteria or item of interest. For example, a trader would visualize the moving average moving up the price axis indicating that the moving average is increasing in value. Preferably, when the price axis is repositioned, the axis would slowly be repositioned such that the moving average would return to the center of the display. The trader would visually recognize the moving average has increased in value and can easily see the next change in moving average. Moreover, by centering around the moving average, for example, the trader would know if he or she is trading above or below the moving average by trading above or below the centered average.

IV. Conclusion

Assimilation of market information is important to the success of the trader. According to the preferred embodiments, market information is displayed relative to an axis of prices and the information is centered on the chosen item of interest. As market conditions move along the axis of prices, the display of market information may be repositioned, at a selected rate if so desired, around the item of interest. By centering market information around the item of interest, a trader may assimilate the market information more efficiently. In addition, the repositioning of the price axis may occur at some rate. The rate may be dynamically variable or fixed. The rate may range in speeds from instantaneously repositioning to very slow repositioning. Preferably, the rate may be set slow enough to augment the assimilation of market information by enhancing the movement in the market according to some chose criteria or item of interest.

The present embodiments utilize a price axis. Displaying market information in relation to a price axis allows for exceptional market feel and an intuitive sense of where the market is headed. By using a vertically aligned axis of prices, for example, when the inside market moves up in value, the inside market indicators move up the axis and the when the inside market moves down in value, the inside market indicators move down the axis. Of course, the price axis may be aligned in other directions besides vertically, such as horizontally, for example. As a result of moving along an axis, the preferred embodiments may be utilized to gradually and continuously reposition the price axis and the market information concurrently, so that a more desirable portion of the price axis and the market information can be viewed.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. Thus, all variations that come within the scope and spirit of the following claims and equivalents thereto are claimed as the invention.

What is claimed is:

1. A non-transitory computer readable medium having instructions stored therein, which when executed by a processor cause the processor to carry out acts comprising:
    displaying a display region having an item of interest displayed along a plurality of axially aligned price levels according to a value of the item of interest; and
    repositioning the plurality of axially aligned price levels to a second set of axially aligned price levels based on a second change in the value of the item of interest, the plurality of axially aligned price levels being repositioned to the second set subsequent to initiating and prior to completing repositioning of the plurality of axially aligned price levels to a first set of axially aligned price levels in response to a first change in the value of the item of interest, the first set of axially aligned price levels being different than the second set of axially aligned price levels.

2. The non-transitory computer readable medium of claim 1 where subsequent to repositioning the plurality of axially aligned price levels to the second set of axially aligned price levels, the item of interest is displayed relative to a designated location in the display region.

3. The non-transitory computer readable medium of claim 1 where the item of interest represents at least one of a best bid price, a best ask price, a moving average of the inside market, and a last traded price.

4. The non-transitory computer readable medium of claim 1 where the value of the item of interest is determined according to an equation.

5. The non-transitory computer readable medium of claim 1 where the item of interest comprises a user-defined indicator.

6. The non-transitory computer readable medium of claim 1 where repositioning the plurality of axially aligned price levels to the second set of axially aligned price levels comprises centering the item of interest relative to the display region.

7. The non-transitory computer readable medium of claim 1 where repositioning the plurality of price levels to the second set of axially aligned price levels comprises repositioning the plurality of axially aligned price levels at a predetermined rate.

8. The non-transitory computer readable medium of claim 7 where the predetermined rate comprises speeds between substantially 50 pixels per second and substantially 200 pixels per second.

9. The non-transitory computer readable medium of claim 7 where the predetermined rate comprises any of a fixed rate and a variable rate.

10. The non-transitory computer readable medium of claim 7 where the predetermined rate changes based on at least one of the item of interest being repositioned, and a location of the item of interest.

11. The non-transitory computer readable medium of claim 1, where the acts further comprise:
displaying an order entry region having a plurality of order entry locations, where each order entry location of the plurality of order entry locations corresponds to at least one of the plurality of axially aligned price levels;
receiving a user command via at least one order entry location; and
initiating placement of a trade order responsive to receiving the user command, where the trade order comprises an order price determined according to a price level corresponding to the at least one order entry location.

12. The non-transitory computer readable medium of claim 11 where the user command comprises selecting the at least one order entry location via a single action of a user input device.

13. The non-transitory computer readable medium of claim 12 where the single action comprises any of a single click of the user input device and a double click of the user input device.

14. The non-transitory computer readable medium of claim 11 where the acts further comprise setting a plurality of order parameters in response to receiving the user command.

15. A method for repositioning market information comprising:
displaying, via a computing device, a display region having an item of interest displayed along a plurality of axially aligned price levels according to a value of the item of interest; and
repositioning, via a computing device, the plurality of axially aligned price levels to a second set of axially aligned price levels based on a second change in the value of the item of interest, the plurality of axially aligned price levels being repositioned to the second set subsequent to initiating and prior to completing repositioning of the plurality of axially aligned price levels to a first set of axially aligned price levels in response to a first change in the value of the item of interest, the first set of axially aligned price levels being different than the second set of axially aligned price levels.

16. The method of claim 15 where subsequent to repositioning the plurality of axially aligned price levels to the second set of axially aligned price levels, the item of interest is displayed relative to a designated location in the display region.

17. The method of claim 15 where the item of interest represents at least one of a best bid price, a best ask price, a moving average of the inside market, and a last traded price.

18. The method of claim 15 where the value of the item of interest is determined according to an equation.

19. The method of claim 15 where the item of interest comprises a user-defined indicator.

20. The method of claim 15 where repositioning the plurality of axially aligned price levels to the second set of axially aligned price levels comprises centering the item of interest relative to the display region.

21. The method of claim 15 where repositioning the plurality of price levels to the second set of axially aligned price levels comprises repositioning the plurality of axially aligned price levels at a predetermined rate.

22. The method of claim 21 where the predetermined rate comprises speeds between substantially 50 pixels per second and substantially 200 pixels per second.

23. The method of claim 21 where the predetermined rate comprises any of a fixed rate and a variable rate.

24. The method of claim 21 where the predetermined rate changes based on at least one of the item of interest being repositioned, and a location of the item of interest.

25. The method of claim 15, further comprising:
displaying an order entry region having a plurality of order entry locations, where each order entry location of the plurality of order entry location corresponds to at least one of the plurality of axially aligned price levels;
receiving a user command via at least one order entry location; and
initiating placement of a trade order responsive to receiving the user command, where the trade order comprises an order price determined according to a price level corresponding to the at least one order entry location.

26. The method of claim 25 where the user command comprises selecting the at least one order entry location via a single action of a user input device.

27. The method of claim 26 where the single action comprises any of a single click of the user input device and a double click of the user input device.

28. The method of claim 25 further comprising setting a plurality of order parameters in response to receiving the user command.

\* \* \* \* \*